United States Patent
Abotabl et al.

(10) Patent No.: US 12,376,089 B2
(45) Date of Patent: Jul. 29, 2025

(54) SUB-BAND FULL DUPLEX (SBFD) ALLOCATION WITH DISJOINT SUB-BANDS

(71) Applicant: QUALCOMM Incorporated, San Diego, CA (US)

(72) Inventors: Ahmed Attia Abotabl, San Diego, CA (US); Muhammad Sayed Khairy Abdelghaffar, San Jose, CA (US); Abdelrahman Mohamed Ahmed Mohamed Ibrahim, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 441 days.

(21) Appl. No.: 17/815,931

(22) Filed: Jul. 28, 2022

(65) Prior Publication Data

US 2024/0049199 A1 Feb. 8, 2024

(51) Int. Cl.
H04L 5/12 (2006.01)
H04L 5/14 (2006.01)
H04W 72/0453 (2023.01)

(52) U.S. Cl.
CPC ........... *H04W 72/0453* (2013.01); *H04L 5/14* (2013.01)

(58) Field of Classification Search
CPC .............................. H04L 5/14; H04W 72/0435
USPC .................................. 370/329, 400, 401, 403
See application file for complete search history.

(56) References Cited

U.S. PATENT DOCUMENTS

2021/0320779 A1 10/2021 Huang et al.
2021/0360664 A1 11/2021 Fakoorian et al.
2024/0224343 A1* 7/2024 Abotabl .................... H04L 5/14

FOREIGN PATENT DOCUMENTS

WO 2022015848 A1 1/2022

OTHER PUBLICATIONS

International Search Report and Written Opinion—PCT/US2023/027039—ISA/EPO—Nov. 9, 2023.
Samsung: "Subband Non-Overlapping Full Duplex for NR Duplex Evolution", 3GPP TSG-RAN WG1 Meeting #109-e, R1-2203904, 3rd Generation Partnership Project (3GPP), Mobile Competence Centre, 650, Route Des Lucioles, F-06921, Sophia-Antipolis Cedex, France, vol. RAN WG1, No. e-Meeting, May 9, 2022-May 20, 2022, Apr. 29, 2022, pp. 1-15, XP052153242, Paragraph [04.1], p. 2, p. 4, p. 6 p. 8-p. 9, p. 11, p. 14, paragraph [04.2], figure 8.

* cited by examiner

*Primary Examiner* — Dang T Ton
(74) *Attorney, Agent, or Firm* — Procopio, Cory, Hargreaves, & Savitch LLP

(57) ABSTRACT

A method of wireless communication at a user equipment (UE) and related apparatus are provided. In the method, the UE receives a resource allocation for a first set of resources in a first frequency band that is disjoint from a second frequency band in a sub-band full duplex (SBFD) slot, and communicates with a network node using the first set of resources in the first frequency band and a corresponding second set of resources in the second frequency band. The method improves the resource allocation efficiency for scheduling resources over multiple disjoint sub-bands.

32 Claims, 17 Drawing Sheets

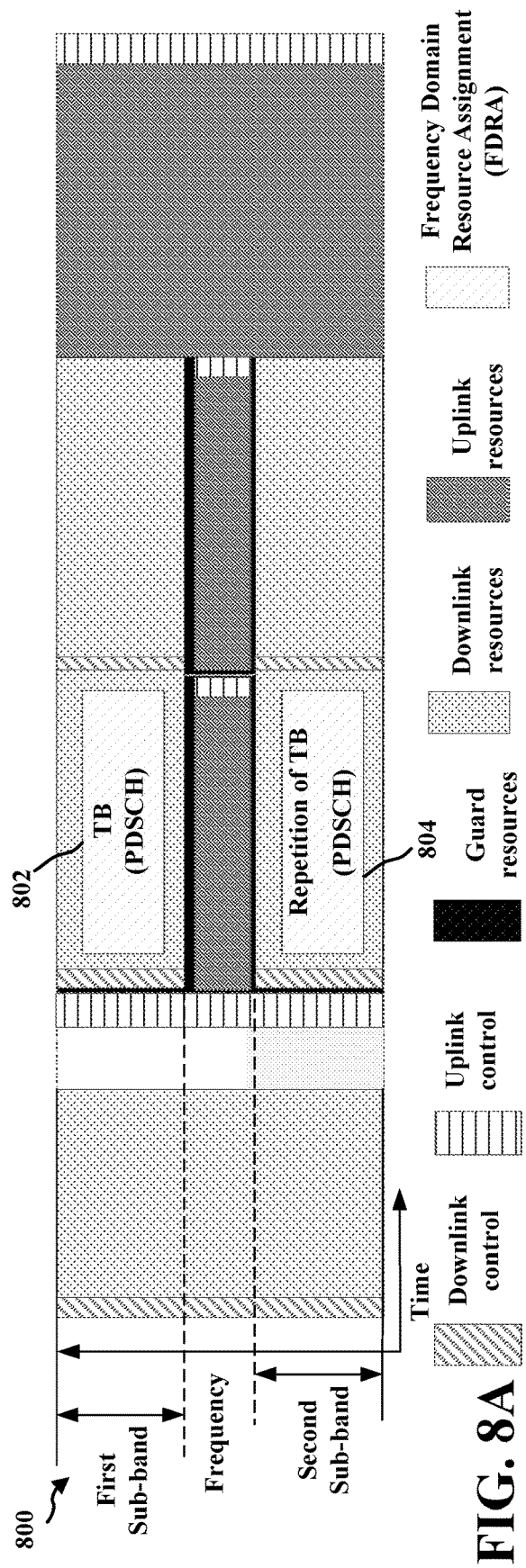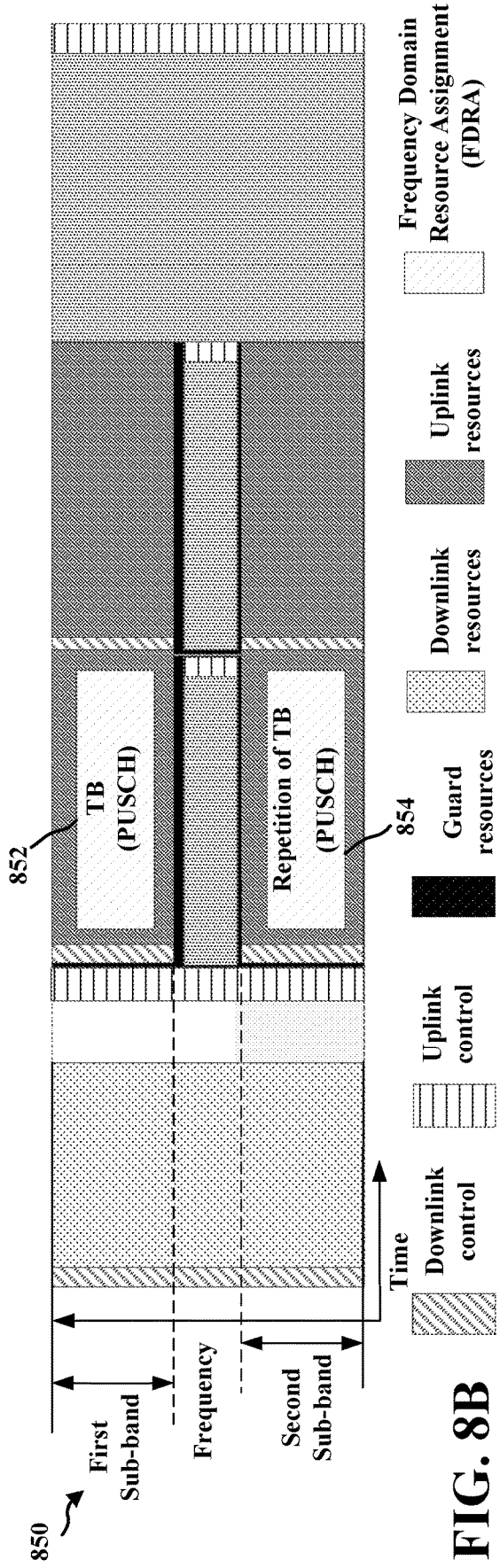
FIG. 8A
FIG. 8B

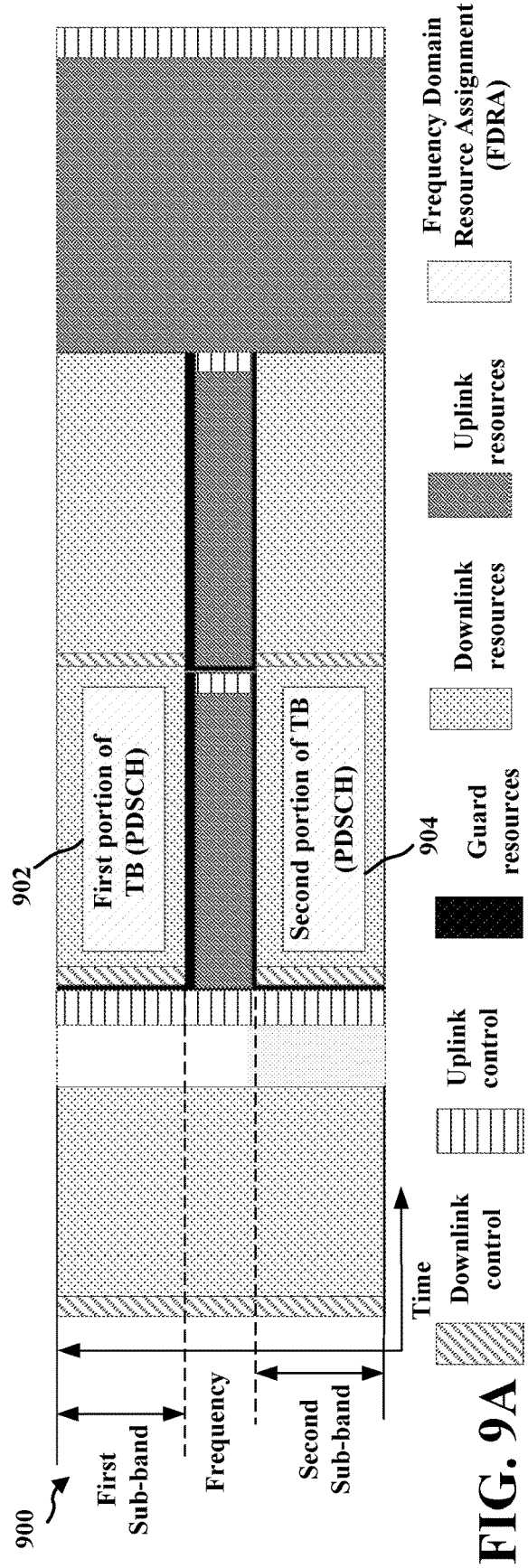
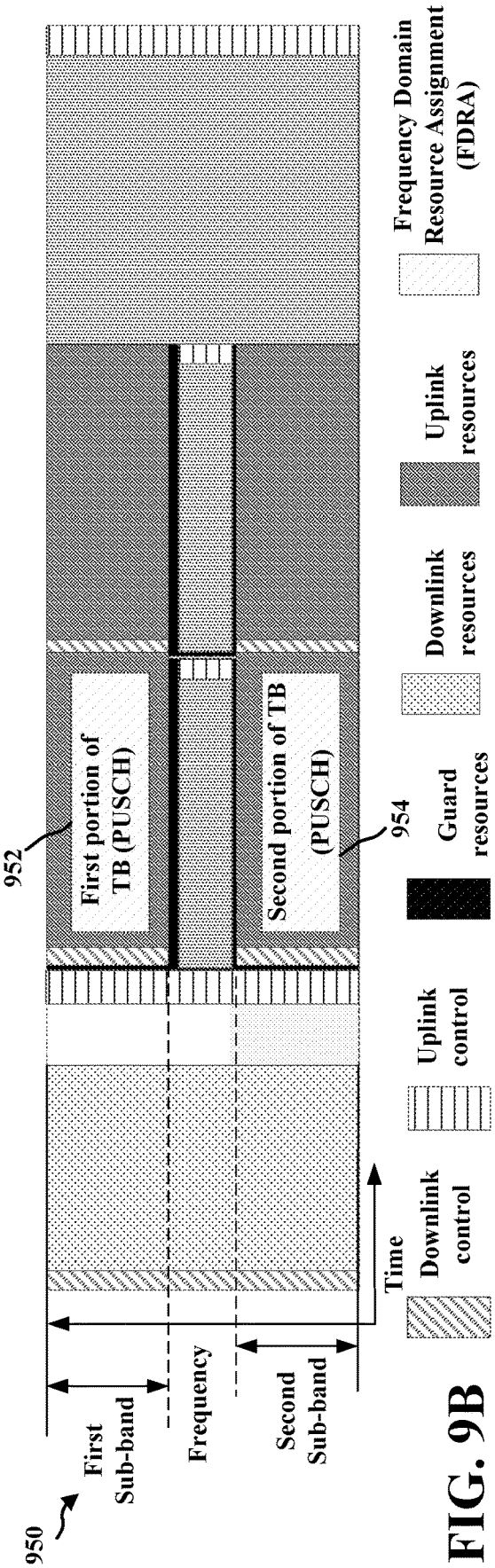
FIG. 9A
FIG. 9B

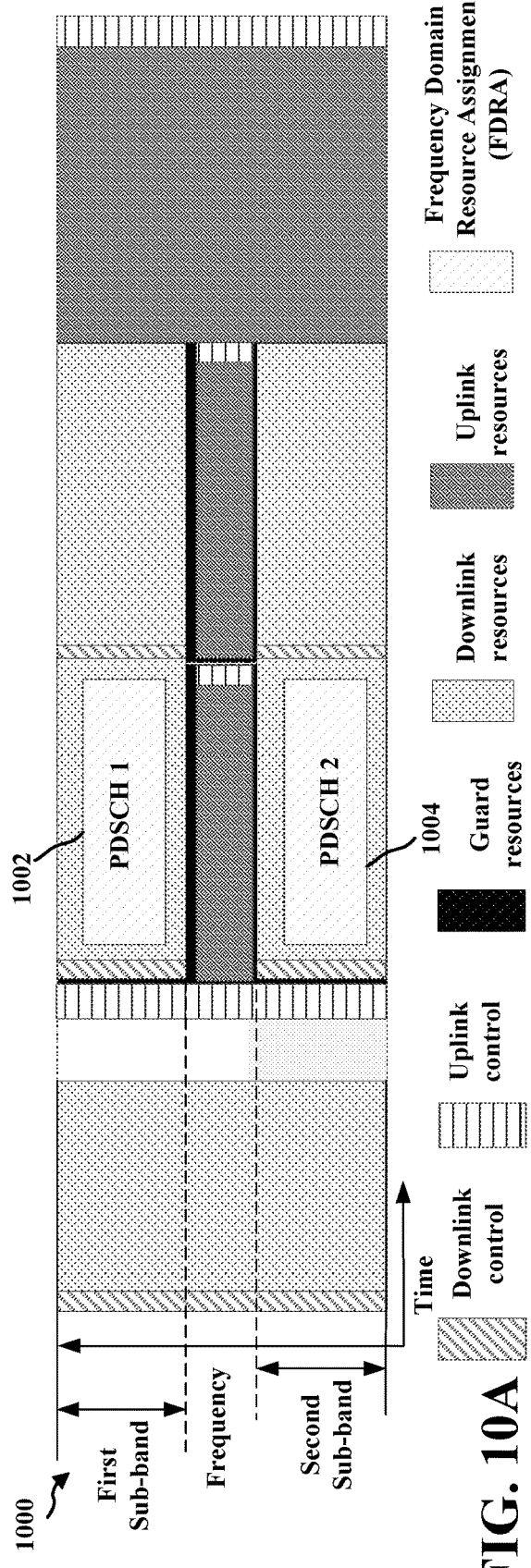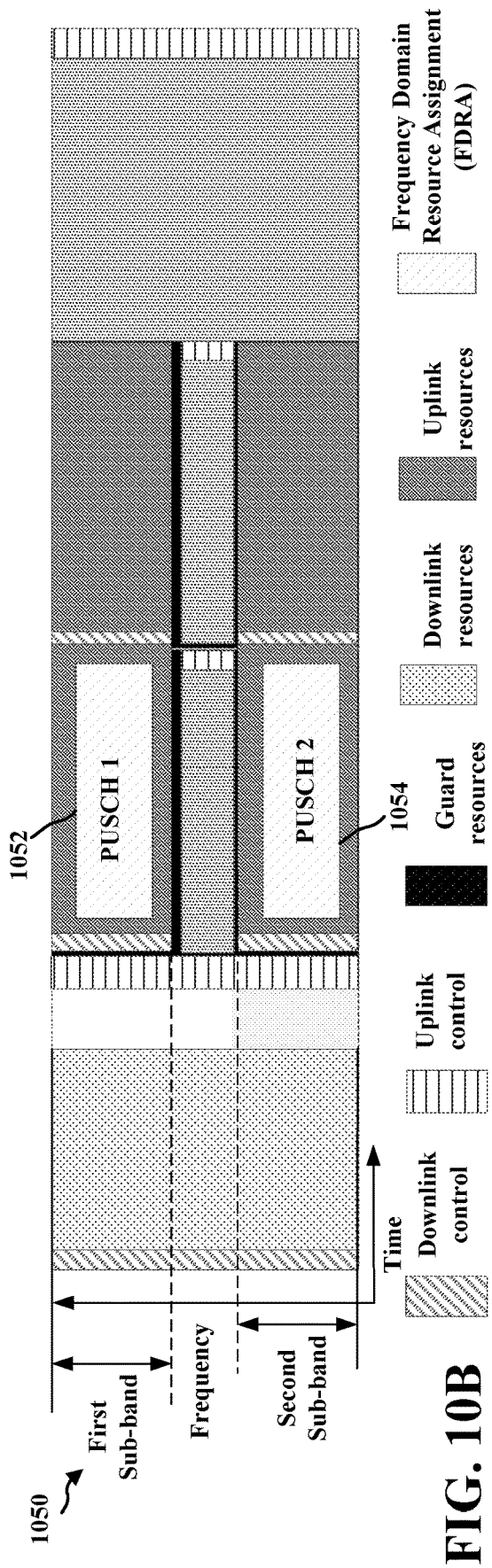
FIG. 10A
FIG. 10B

SUB-BAND FULL DUPLEX (SBFD) ALLOCATION WITH DISJOINT SUB-BANDS

TECHNICAL FIELD

The present disclosure relates generally to communication systems, and more particularly, to wireless communication with sub-band full duplex resource allocations.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In one aspect of the disclosure, a method of wireless communication at a user equipment (UE), related computer-readable medium and apparatus are provided. The apparatus receives a resource allocation for a first set of resources in a first frequency band that is disjoint from a second frequency band in a sub-band full duplex (SBFD) slot; and communicates with a network node using the first set of resources in the first frequency band and a corresponding second set of resources in the second frequency band.

In one aspect of the disclosure, a method of wireless communication at a network node, related computer-readable medium, and related apparatus are provided. The apparatus sends a resource allocation for a first set of resources in a first frequency band that is disjoint from a second frequency band in a sub-band full duplex (SBFD) slot; and communicates with a user equipment (UE) using the first set of resources in the first frequency band and a corresponding second set of resources in the second frequency band.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIGS. 8A and 8B are diagrams illustrating a first SBFD slot format with FDRA for downlink (DL) and uplink (UL), respectively, in accordance with various aspects of the present disclosure.

FIGS. 9A and 9B are diagrams illustrating a second SBFD slot format with FDRA for DL and UL, respectively, in accordance with various aspects of the present disclosure.

FIGS. 10A and 10B are diagrams illustrating a third SBFD slot format with FDRA for DL and UL, respectively, in accordance with various aspects of the present disclosure.

DETAILED DESCRIPTION

Figure 1:
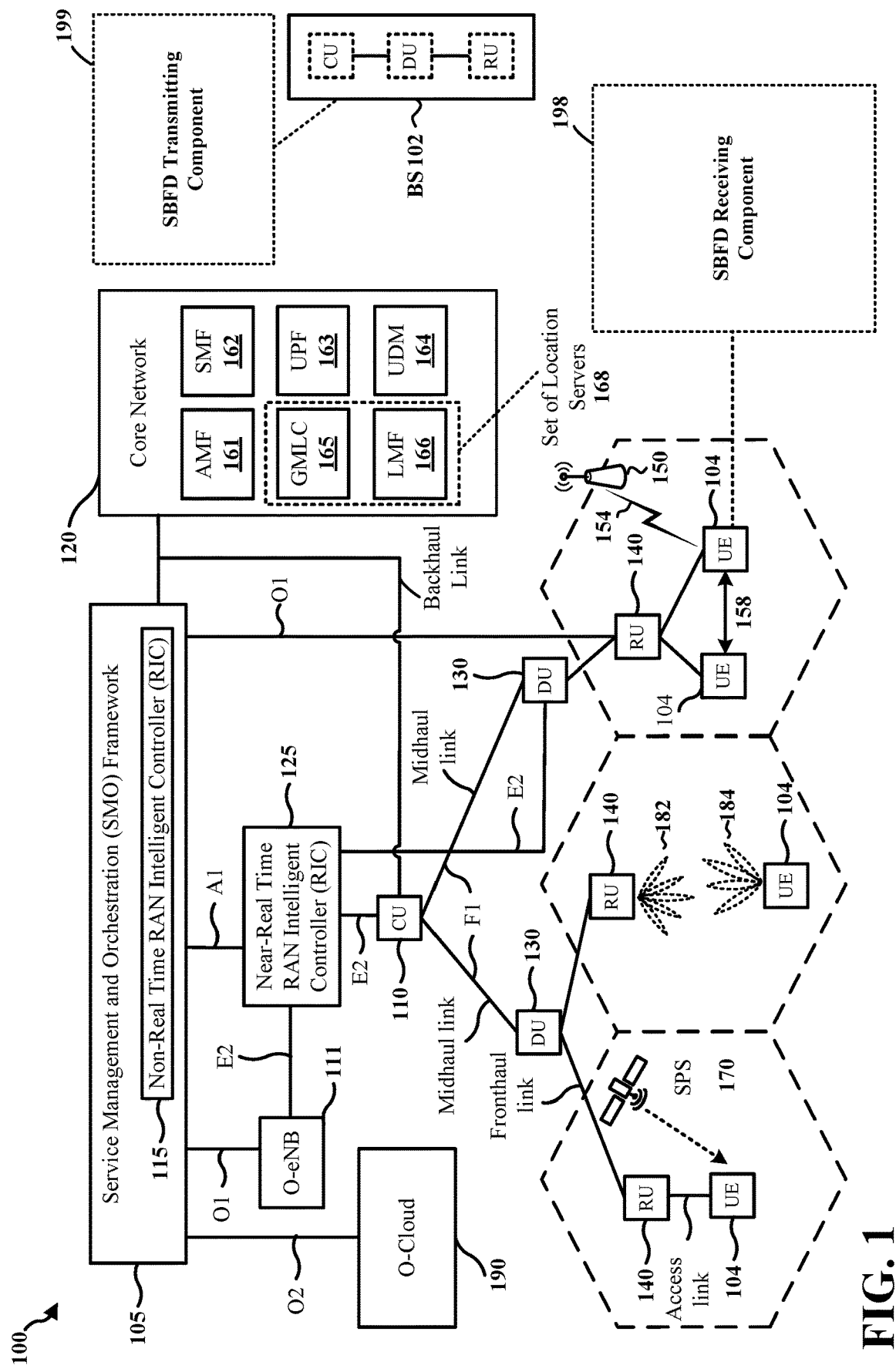
FIG. 1 is a diagram illustrating an example of a wireless communications system and an access network.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspects. For example, transmission and reception of wireless signals necessarily include a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via the creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include, or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may be configured to include an SBFD receiving component 198 that is configured to receive a resource allocation for a first set of resources in a first frequency band that is disjoint from a second frequency band in an SBFD slot and communicate with a network node using the first set of resources in the first frequency band and a corresponding second set of resources in the second frequency band. In certain aspects, the base station 102 may be configured to include an SBFD transmitting component 199 that is configured to send a resource allocation for a first set of resources in a first frequency band that is disjoint from a second frequency band in an SBFD slot; and communicate with a user equipment (UE) using the first set of resources in the first frequency band and a corresponding second set of resources in the second frequency band. Although the following description may be focused on 5G NR, the concepts described herein may be applicable to other similar areas, such as LTE, LTE-A, CDMA, GSM, and other wireless technologies.

Figure 2:
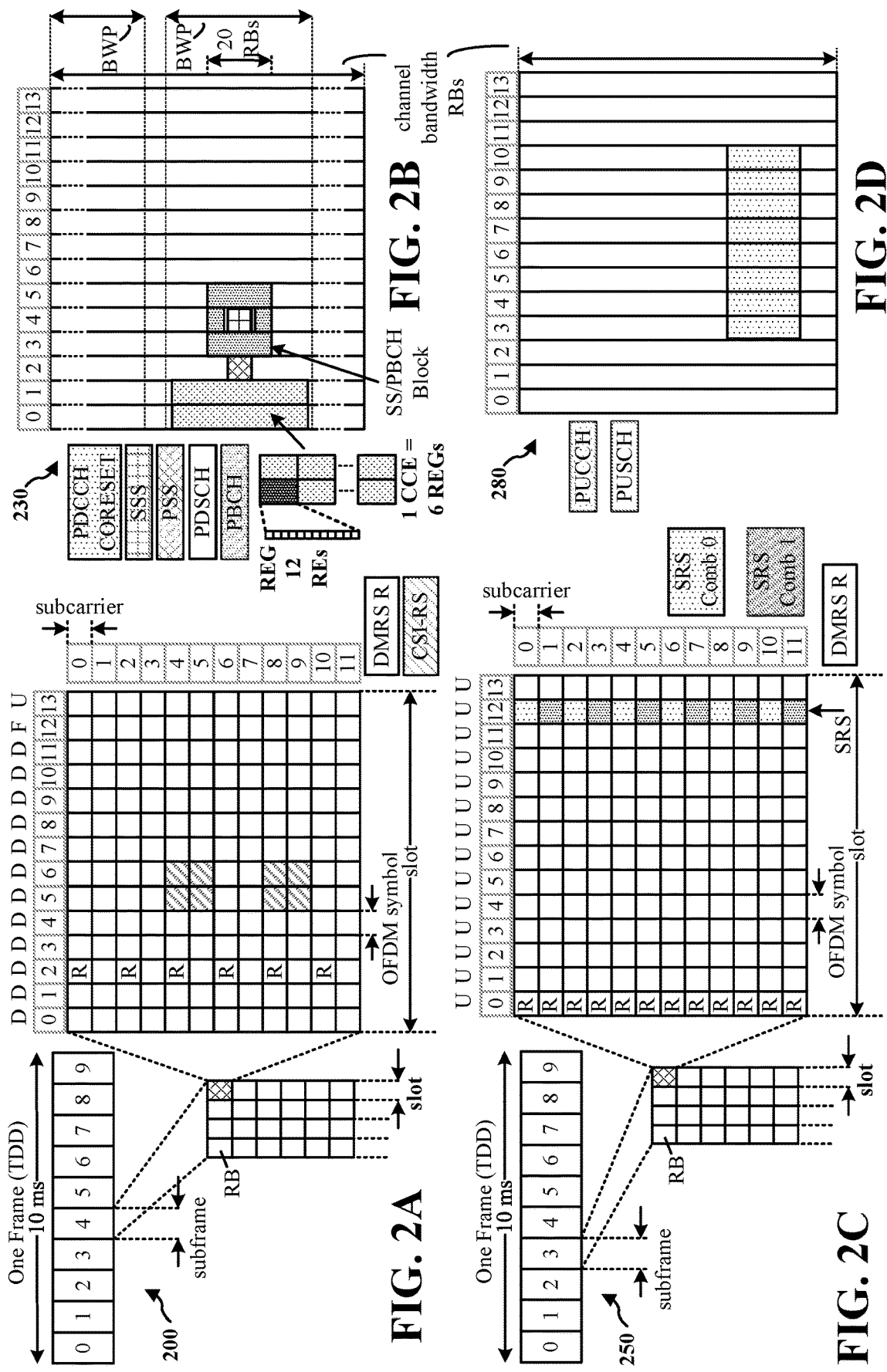
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS $\Delta f = 2^\mu \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and 2 slots/subframe. The subcarrier spacing may be equal to 2*15 kHz, where y is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
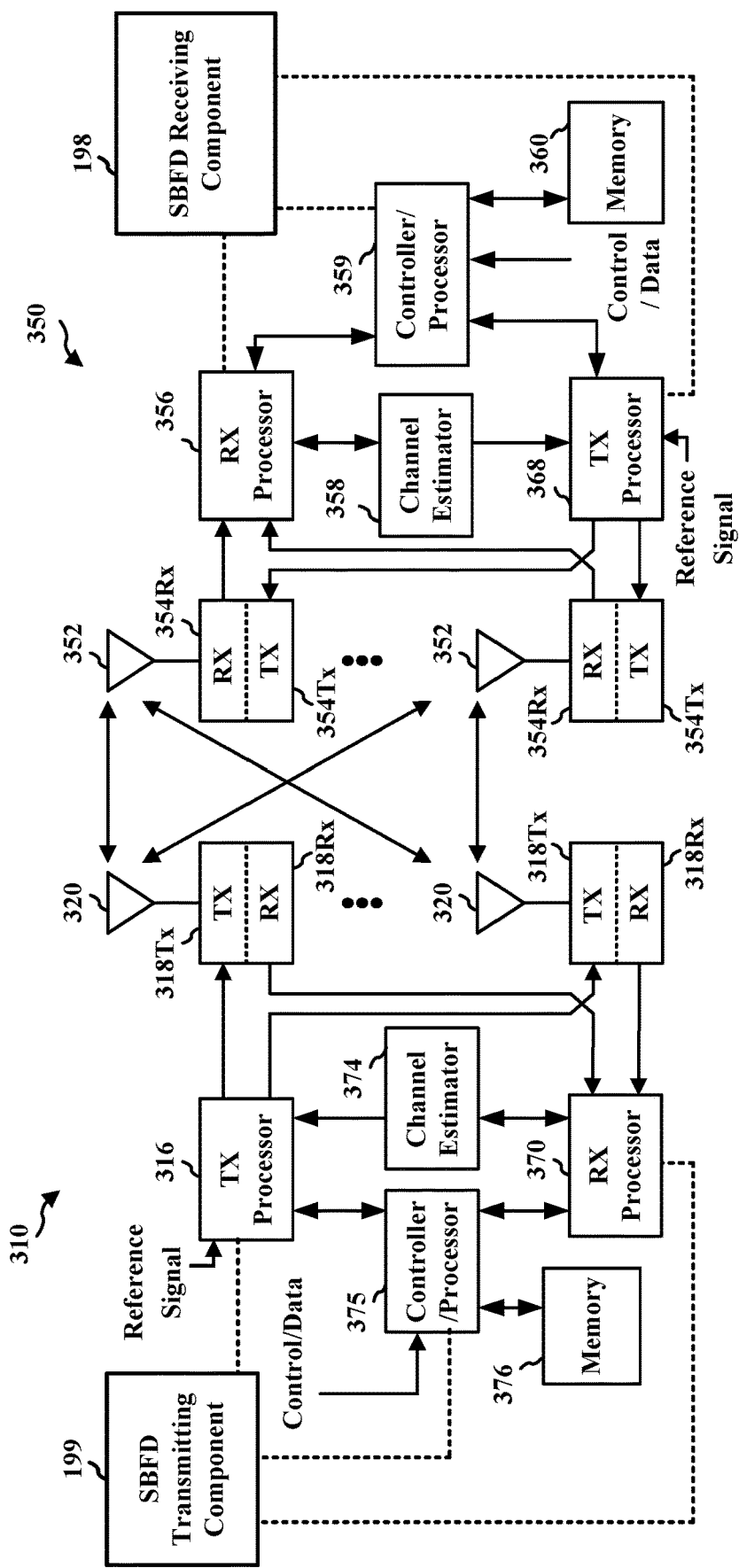
FIG. 3 is a diagram illustrating an example of a base station and a user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the SBFD receiving component 198 of FIG. 1.

At least one of the TX processor 316, the RX processor 370, and the controller/processor 375 may be configured to perform aspects in connection with the SBFD transmitting component 199 of FIG. 1.

Wireless communication systems may be configured to share available system resources and provide various telecommunication services (e.g., telephony, video, data, messaging, broadcasts, etc.) based on multiple-access technologies that support communication with multiple users. Full duplex operation in which a wireless device exchanges uplink and downlink communication that overlaps in time may enable more efficient use of the wireless spectrum. Full duplex operation may include simultaneous transmission and reception in the same frequency range. In some examples, the frequency range may be an mmW frequency range, e.g., frequency range 2 (FR2). In some examples, the frequency range may be a sub-6 GHz frequency range, e.g., frequency range 1 (FR1). Full duplex communication may reduce latency. For example, full duplex operation may enable a UE to receive a downlink signal in an uplink-only slot, which can reduce the latency for the downlink communication. Full duplex communication may improve spectrum efficiency, e.g., spectrum efficiency per cell or per UE. Full duplex communication may enable more efficient use of wireless resources.

FIGS. 4A-4D illustrate various modes of full duplex communication. Full duplex communication supports transmission and reception of information over the same frequency band in a manner that overlaps in time. In this manner, spectral efficiency may be improved with respect to the spectral efficiency of half-duplex communication, which supports transmission or reception of information in one direction at a time without overlapping uplink and downlink communication. Due to the simultaneous Tx/Rx nature of full duplex communication, a UE or a base station may experience self-interference caused by signal leakage from its local transmitter to its local receiver. In addition, the UE or base station may also experience interference from other devices, such as transmissions from a second UE or a second base station. Such interference (e.g., self-interference or interference caused by other devices) may impact the quality of the communication, or even lead to a loss of information.

Figure 4A:
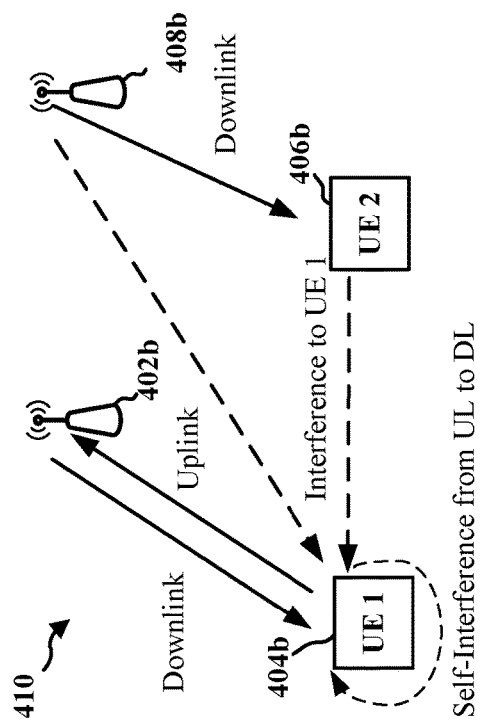
FIGS. 4A, 4B, 4C, and 4D illustrate various modes of full duplex communication.

FIG. 4A shows a first example of full duplex communication 400 in which a first base station 402a is in full duplex communication with a first UE 404a and a second UE 406a. The first UE 404a and the second UE 406a may be configured for half-duplex communication or full-duplex communication. FIG. 4A illustrates the first UE 404a performing downlink reception, and the second UE 406a performing uplink transmission. The second UE 406a may transmit a first uplink signal to the first base station 402a as well as to other base stations, such as a second base station 408a in proximity to the second UE 406a. The first base station 402a transmits a downlink signal to the first UE 404a concurrently (e.g., overlapping at least partially in time) with receiving the uplink signal from the second UE 406a. The base station 402a may experience self-interference at its receiving antenna that is receiving the uplink signal from UE 406a, the self-interference being due to reception of at least part of the downlink signal transmitted to the UE 404a. The base station 402a may experience additional interference due to signals from the second base station 408a. Interference may also occur at the first UE 404a based on signals from the second base station 408a as well as from uplink signals from the second UE 406a.

Figure 4B:
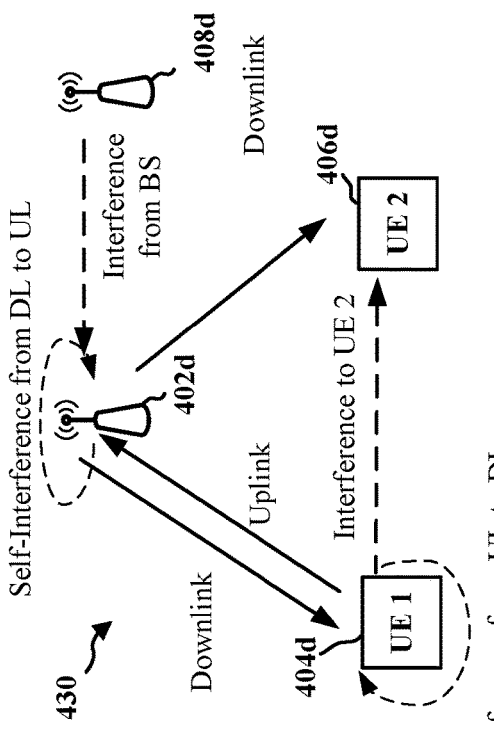

FIG. 4B shows a second example of full-duplex communication 410 in which a first base station 402b is in full-duplex communication with a first UE 404b. In this example, the UE 404b is also operating in a full-duplex mode. The first base station 402b and the UE 404b receive and transmit communication that overlaps in time and is in the same frequency band. The base station and the UE may each experience self-interference, due to a transmitted signal from the device leaking to (e.g., being received by) a receiver at the same device. The first UE 404b may experience additional interference based on one or more signals emitted from a second UE 406b and/or a second base station 408b in proximity to the first UE 404b.

Figure 4C:
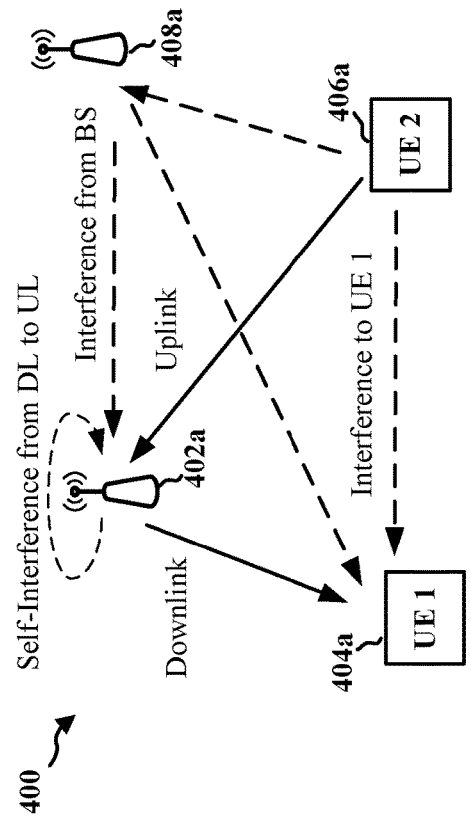

FIG. 4C shows a third example of full-duplex communication 420 in which a first UE 404c transmits and receives full-duplex communication with a first base station 402c and a second base station 408c. The first base station 402c and the second base station 408c may serve as multiple transmission and reception points (multi-TRPs) for UL and DL communication with the UE 404c. The second base station 408c may also exchange communication with a second UE 406c. In FIG. 4C, the first UE 404c may transmit an uplink signal to the first base station 402c that overlaps in time with receiving a downlink signal from the second base station 408c. The first UE 404c may experience self-interference as a result of receiving at least a portion of the first signal when receiving the second signal, e.g., the UE's uplink signal to the base station 402c may leak to (e.g., be received by) the UE's receiver when the UE is attempting to receive the signal from the other base station 408c. The first UE 404c may experience additional interference from the second UE 406c.

Figure 4D:
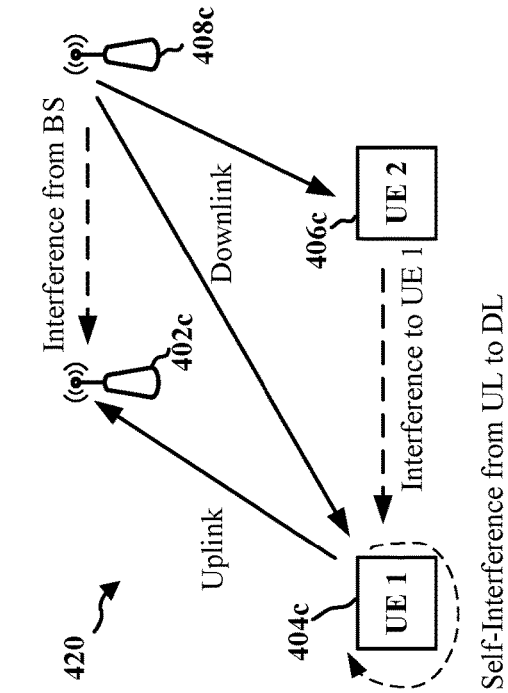

FIG. 4D shows a fourth example of full-duplex communication 430 in which a first base station 402d employs full-duplex communication with a first UE 404d, and transmits downlink communication to a second UE 406d. In this example, the first UE 404d is operating in a full-duplex mode, and the second UE 406d is operating in a half-duplex mode. The first base station 402d and the first UE 404d receive and transmit communication that overlaps in time and is in the same frequency band. The base station 402d and the first UE 404d may each experience self-interference, due to a transmitted signal from the corresponding device leaking to (e.g., being received by) a receiver at the same device. The base station 402d may further experience cross link interference due to a signal transmitted by the base station 408d. The second UE 406d may experience cross-link interference from the uplink transmission of the first UE 404b when receiving downlink communication from the base station 402d.

Figure 5:
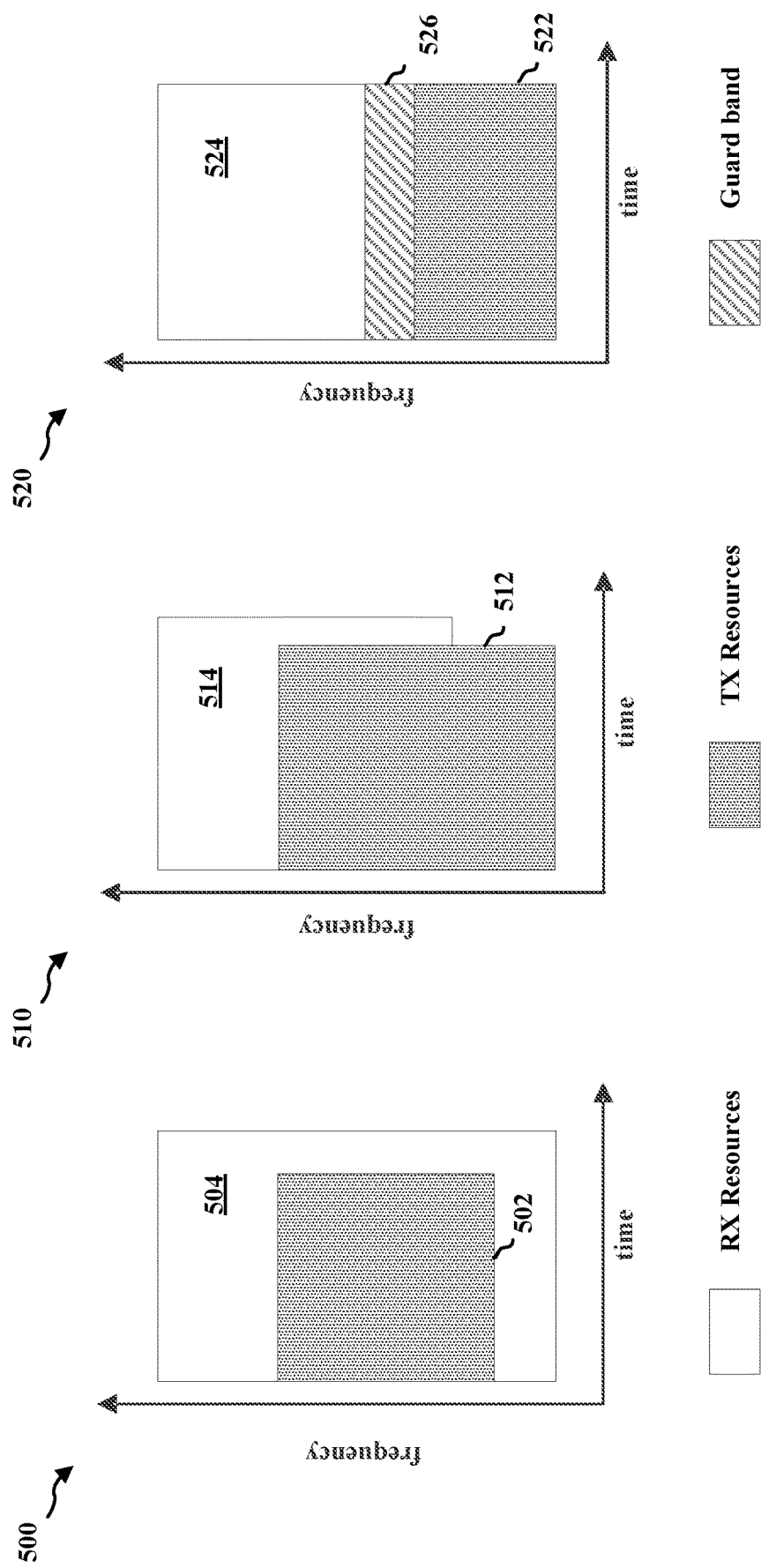
FIG. 5 illustrates examples of in-band full-duplex (IBFD) and sub-band frequency divisional duplex resources.

Full duplex communication may be in the same frequency band. The uplink and downlink communication may be in different frequency sub-bands, in the same frequency sub-band, or in partially overlapping frequency sub-bands. FIG. 5 illustrates a first example 500 and a second example 510 of in-band full-duplex (IBFD) resources and a third example 520 of sub-band full-duplex resources. In IBFD, signals may be transmitted and received in overlapping times and overlapping in frequency. As shown in the first example 500, a time and a frequency allocation of transmission resources 502 may fully overlap with a time and a frequency allocation of reception resources 504. In the second example 510, a time and a frequency allocation of transmission resources 512 may partially overlap with a time and a frequency of allocation of reception resources 514.

IBFD is in contrast to sub-band FDD, where transmission and reception resources may overlap in time using different frequencies, as shown in the third example 520. In the third example 520, the UL, the transmission resources 522 are separated from the reception resources 524 by a guard band 526. The guard band may be frequency resources, or a gap in frequency resources, provided between the transmission resources 522 and the reception resources 524. Separating the transmission frequency resources and the reception frequency resources with a guard band may help to reduce self-interference. Transmission resources and reception resources that are immediately adjacent to each other may be considered as having a guard band width of 0. As an output signal from a wireless device may extend outside the transmission resources, the guard band may reduce interference experienced by the wireless device. Sub-band FDD may also be referred to as "flexible duplex".

If the full-duplex operation is for a UE or a device implementing UE functionality, the transmission resources 502, 512, and 522 may correspond to uplink resources, and the reception resources 504, 514, and 524 may correspond to downlink resources. Alternatively, if the full-duplex operation is for a base station or a device implementing base station functionality, the transmission resources 502, 512, and 522 may correspond to downlink resources, and the reception resources 504, 514, and 524 may correspond to uplink resources.

Figure 6:
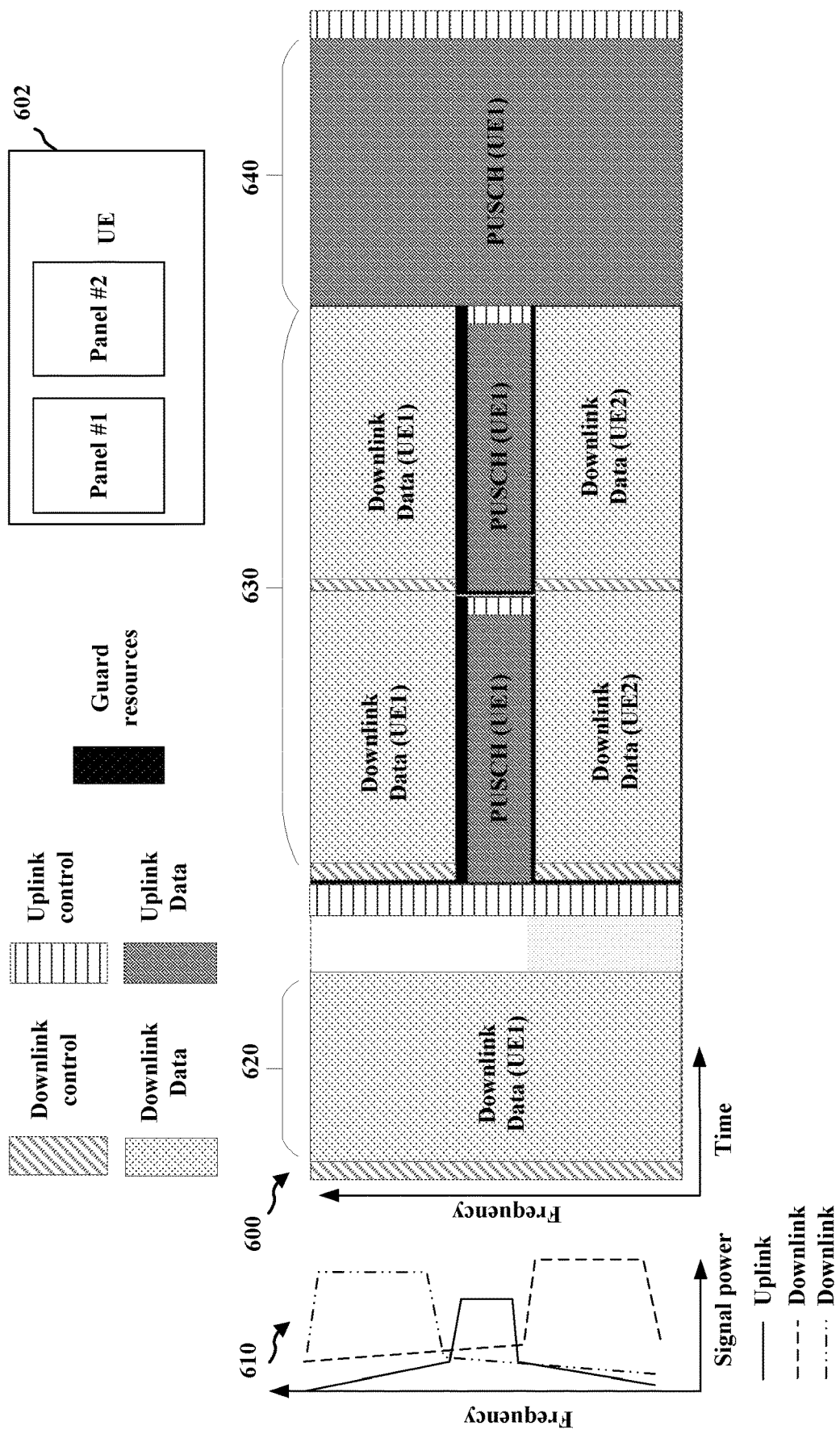
FIG. 6 illustrates an example device for simultaneous transmission and reception in full-duplex operation.

FIG. 6 illustrates an example device 602 that includes separate panels, e.g., antenna panels, for simultaneous transmission and reception in full-duplex operation. For example, the device 602 is illustrated as including panel #1 and panel #2. In some examples, panel #1 may be for downlink transmission. The downlink transmission may be at both edges of a frequency band, such as illustrated in 600 and 610. Panel #2 may be for uplink reception, such as using frequency resources within a frequency band, such as at a middle of the frequency band. Sub-band full duplex operation, such as described in connection with FIG. 5 may be associated with an isolation of greater than 40 dB. As shown in FIG. 5, the downlink and uplink resources may be in different portions of a frequency band with a guard band between the uplink and downlink portions of the frequency band. FIG. 6 illustrates an example set of time and frequency resources 600 that include both half duplex and full duplex periods. For example, the period of time 620 includes half duplex resources for downlink data, e.g., panel #1 and panel #2 may both receive downlink data during the period of time 620. The period of time 630 includes sub-band full-duplex resources for uplink transmissions (e.g., PUSCH) and downlink reception (e.g., downlink data), e.g., panel #1 may receive downlink data and panel #2 may transmit PUSCH during the period of time 630. The period of time 640 includes half duplex resources for uplink data, e.g., panel #1 and panel #2 may both transmit PUSCH during the period of time 640. FIG. 6 also includes a graph 610 showing a signal power over frequency that shows that uplink and downlink signals leak outside of the frequency range provided in the sub-band full-duplex resources of period of time 630.

A slot format may be referred to as a "D+U" slot when the slot has a frequency band that is used for both uplink and downlink transmissions. The downlink and uplink transmissions may occur in overlapping frequency resources (e.g., in-band full duplex resources) or may occur in adjacent or slightly separated frequency resources (e.g., sub-band full duplex resources), as shown in FIG. 5. In a particular D+U symbol, a half-duplex device may either transmit in the uplink band or receive in the downlink band. In a particular D+U symbol, a full-duplex device may transmit in the uplink band and receive in the downlink band, e.g., in the same symbol or in the same slot. A D+U slot may include downlink-only symbols, uplink-only symbols, and full-duplex symbols. For example, in FIG. 6, the period of time 620 may extend for one or more symbols (e.g., downlink-only symbols), the period of time 640 may extend for one or more symbols (e.g., uplink-only symbols), and the period of time 630 may extend for one or more symbols (e.g., full-duplex symbols or D+U symbols).

A UE may receive an allocation of resources from a base station for the UE to use for uplink transmissions and/or for downlink reception. For example, a base station may allocate resources to a UE for uplink transmission, such as PUSCH transmissions. As an example, the base station may transmit downlink control information (DCI) scheduling uplink resources for the UE to use for a PUSCH transmission. In some aspects, the DCI may be referred to as a scheduling DCI. In other aspects, the base station may transmit DCI to the UE indicating resources for the UE to use for reception of a downlink transmission, e.g., such as PDSCH. As an example, the scheduling information, e.g., in the DCI, may indicate a frequency domain resource allocation (FDRA).

The frequency domain resource allocation may indicate disjoint RBs (which may be referred to as an allocation type 0) or consecutive RBs (which may be referred to as an allocation type 1). The disjoint RB allocation (e.g., allocation type 0) may be indicated via a bitmap-based resource allocation scheme, in which a bitmap in the DCI indicates the allocated resource block groups (RBGs). As an example, the bitmap size may be 18 bits or 9 bits (or in other examples may have a different size), and the allocation may be in multiple of RBGs, and the disjoint allocation allows for the allocated RBGs to be consecutive or non-consecutive. The RBG size may depend on the BWP size and/or a configuration type. As an example, the RBG size may be configured by the parameter rbg-size via the configuration command ENUMERATED{config1, config2} in an RRC message. Table 1 shows an example set of RBG sizes under various rbg-size configurations and the BWP sizes.

TABLE 1

Example RBG sizes under various configuration types and the BWP sizes

| BWP size | RBG size | |
|---|---|---|
| | configuration 1 | configuration 2 |
| 1-36 | 2 | 4 |
| 37-72 | 4 | 8 |
| 73-144 | 8 | 16 |
| 145-275 | 16 | 16 |

In a consecutive RB allocation (e.g., allocation type 1), the DCI may schedule a consecutive set of RBs for the UE. As an example, the size of the allocated resources may be based on a parameter $RB_{start}$ that indicates a starting RB of the allocation and a parameter indicating a number of consecutive RBs ($L_{RB_s}$) for the allocation. These two parameters may be combined into a resource indication value (RIV) parameter. As an example, the starting RB parameter and the number of consecutive RBs parameter may be combined in the following equation:

if $(L_{RB_s}-1) \leq \lfloor N_{BWP}^{size}/2 \rfloor$ then $RIV = N_{BWP}^{size}(L_{RB_s}-1) + RB_{start}$ else $RIV = N_{BWP}^{size}(N_{BWP}^{size} - L_{RB_s} + 1) + (N_{BWP}^{size} - 1 - RB_{start})$ where $L_{RB_s}$ is the length in terms of contiguously allocated RBs, and $N_{BWP}^{size}$ is the BWP size.

SBFD slots may have two disjoint DL or UL allocations (i.e., disjoint DL or UL sub-bands), e.g., such as shown in the examples in 520 in FIG. 5 and/or 630 in FIG. 6. Two disjoint DL sub-bands may be separated by a UL band in addition to any guard bands, and similarly, two disjoint UL sub-bands may be separated by a DL band in addition to any guard bands.

As the sub-bands are disjoint, a scheduling scheme with a start and length indication to indicate a consecutive resource allocation (e.g., allocation type 1), whereas the two sub-bands are disjoint and non-consecutive due to the existence of a separating band. A bitmap scheduling scheme (e.g., allocation type 0) may be inefficient because the bitmap would include bits that represent RBs in the separating band that cannot be allocated. The bitmap may be complicated and the added bits representing the separating band do not represent the useful bandwidth. Therefore, aspects presented herein provide for efficient resource allocation that can schedule resources over multiple disjoint sub-bands using signaling that can be interpreted both for non-disjoint resources (e.g., such as shown at 620 and 640 in FIG. 6) and for disjoint resources (e.g., such as shown at 630 in FIG. 6). Thus, control information, e.g., scheduling DCI, may be used for allocating resources over one frequency band or multiple frequency bands, e.g., and may be interpreted differently by a UE receiving the control information.

Figure 7:
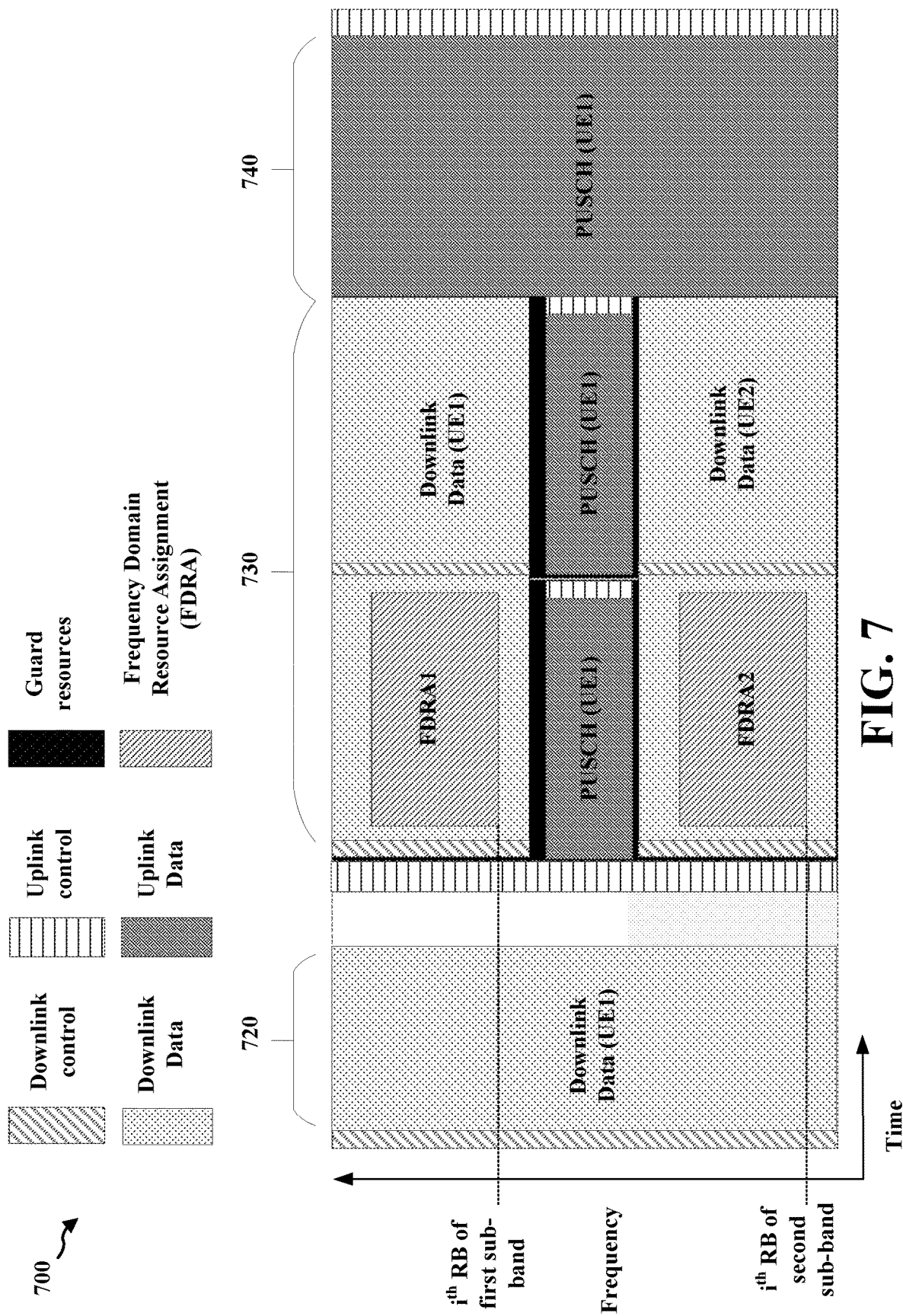
FIG. 7 is a diagram of a sub-band full duplex (SBFD) slot format with frequency domain resource allocation (FDRA) in accordance with various aspects of the present disclosure.

FIG. 7 is a diagram of an SBFD slot format 700 with frequency domain resource allocation (FDRA) in accordance with various aspects of the present disclosure. FIG. 7 illustrates a time period 720 with half-duplex downlink resources, a time period 740 with half-duplex uplink resources, and a time period 730 with SBFD resources including disjoint frequency resources for downlink. The slot format shown in FIG. 7 is similar to the slot format shown in FIG. 6, except that two frequency domain resource allocations (FDRA1 and FDRA2) are respectively allocated in two disjoint sub-bands for downlink reception, at 730. As presented herein, the FDRA1 and FDRA2 may be indicated to the UE in scheduling information that indicates the FDRA for one of the two disjoint sub-bands. In one configuration, in a full-duplex slot with two disjoint sub-bands, the UE may interpret the frequency domain resource allocation indicated for one sub-band (i.e., FDRA1) to also allocate a corresponding frequency domain resource allocation over the other sub-band (i.e., FDRA2). In the example shown in FIG. 7, the frequency domain allocation is shown for resources for a downlink transmission, but the concepts presented herein can similarly be applied for resources allocated for an uplink transmission in disjoint sub-bands. In this example, a base station may transmit scheduling information, such as a scheduling DCI that indicates an FDRA in one of multiple disjoint sub-bands, and the UE may interpret the scheduling DCI as allocating an FDRA in each of the disjoint sub-bands. Although examples are presented for an allocation of resources in DCI, the concept presented herein can similarly be applied to other resource allocation methods. For example, the base station may allocate resources via configured grants or other semi-persistent scheduling that indicates an FDRA in one of multiple disjoint sub-bands, and the UE may interpret the resource allocation as allocating an FDRA in each of the disjoint sub-bands. For example, the UE may receive a configuration of resources in RRC signaling and/or indicated via a MAC-CE, that indicates resources in one sub-band, and the UE may interpret the allocation of resources as an allocation in multiple, disjoint frequency sub-bands.

The frequency domain resource allocation over the two disjoint sub-bands may be interpreted or applied in various ways. FIG. 8A is a diagram illustrating a first SBFD slot format 800 in which an FDRA for downlink resources is interpreted as allocated in multiple, disjoint sub-bands. As shown in FIG. 8A, the downlink resources include two sub-bands (the first sub-band and the second sub-band) that are separated by guard resources (i.e., guard band) and uplink resources. The UE may receive scheduling information that indicates the first FDRA 802 in the first sub-band, and may interpret the scheduling information as allocating the corresponding second FDRA 804 in the second sub-band. As shown in FIG. 8A, the UE may receive a PDSCH (e.g., including a transport block (TB) of data) in the first FDRA 802 in the first sub-band and may receive a repetition of the PDSCH (e.g., a repetition of the TB) in the second FDRA 804 in the second sub-band. The same concepts may be applicable for disjoint uplink resources. FIG. 8B is a diagram illustrating the first SBFD slot format 850 with disjoint uplink resources. As shown in FIG. 8B, the uplink resources include two sub-bands (the first sub-band and the second sub-band) that are separated by guard resources (i.e., guard band) and downlink resources. The UE may receive scheduling information that indicates uplink resources (e.g., a first FDRA 852) and may interpret the scheduling information as allocating a corresponding second FDRA 854 in the second sub-band. As described in connection with FIG. 8A, in FIG. 8B, the UE may transmit a PUSCH (e.g., including a TB of data) in the first FDRA 852 in the first sub-band and may transmit a repetition of the PUSCH (e.g., including a repetition of the TB) in the second FDRA 854 in the second sub-band.

FIG. 9A illustrates a slot format 900 similar to that of FIG. 8A. As shown in FIG. 9A, the downlink resources include two sub-bands (the first sub-band and the second sub-band) that are separated by guard resources (i.e., guard band) and uplink resources. The UE may receive scheduling information that indicates resources (e.g., first FDRA 902) in one sub-band and may interpret the scheduling information to allocate a corresponding set of resources (e.g., second FDRA 904) in the other sub-band, e.g., with the first FDRA 902 and the second FDRA 904 respectively allocated in the first sub-band and the second sub-band. In contrast to the example in FIG. 8A, in which the UE received a repetition of the PDSCH in the second FDRA, in FIG. 9A, the same TB may be mapped over the downlink resources within the first and the second sub-bands. That is, the first FDRA 902 on the first sub-band may include a first portion of the TB, and the second FDRA 904 on the second sub-band may include the second portion of the TB. The same scheme is applicable for uplink resources. FIG. 9B is a diagram illustrating a slot format 950 similar to that of FIG. 8B. As shown in FIG. 9B, the uplink resources include two sub-bands (the first sub-band and the second sub-band) that are separated by guard resources (i.e., guard band) and downlink resources. The first FDRA 952 and the second FDRA 954 are respectively allocated, e.g., by an indication of the first FDRA 952 in scheduling information, in the first sub-band and the second sub-band. The same TB (e.g., for a PUSCH transmission) is mapped over the uplink resources within the first and the second sub-bands. As shown in FIG. 9B, the first FDRA 952 on the first sub-band may include the first portion of the TB, and the second FDRA 954 on the second sub-band may include the second portion of the TB.

FIG. 10A illustrates an example in which different PDSCH transmissions may be transmitted in the resources allocated in the disjoint sub-bands. The slot format 1000 shown in FIG. 10A is similar to those of FIG. 8A and FIG. 9A. As shown in FIG. 10A, the downlink resources include two sub-bands (the first sub-band and the second sub-band) that are separated by guard resources (i.e., guard band) and uplink resources. A UE may receive scheduling information that indicates resources (e.g., first FDRA 1002) in one sub-band, and the UE may interpret the scheduling information to allocate a corresponding set of resources (e.g., second FDRA 1004) in the other sub-band, e.g., with the first FDRA 1002 and the second FDRA 1004 being respectively allocated in the first sub-band and the second sub-band. As shown in FIG. 10A, two PDSCHs may be transmitted respectively in the two FDRAs. For example, the UE may receive a first PDSCH (PDSCH1) in the first FDRA 1002, and may receive a second PDSCH (PDSCH2) in the second FDRA 1004. The same concepts are applicable for uplink resources. FIG. 10B illustrates a slot format 1050 similar to those of FIG. 8B and FIG. 9B. As shown in FIG. 10B, the uplink resources include two sub-bands (the first sub-band and the second sub-band) that are separated by guard resources (i.e., guard band) and downlink resources. The UE may receive control signaling with scheduling information that allocates an FDRA in one of the sub-bands and may interpret the scheduling information as allocating the first FDRA 1052 and the second FDRA 1054 in the first sub-band and the second sub-band, respectively. Two PUSCHs may be transmitted respectively in the two FDRAs. That is, the UE may transmit a first PUSCH (PUSCH1) in the first FDRA 1052, and may transmit a second PUSCH (e.g., PUSCH2) in the second FDRA 1054.

The replication of resources in the frequency domain (e.g., the interpretation of an FDRA for one sub-band as allocating a corresponding FDRA in a disjoint sub-band) may be enabled in various ways. In some aspects, the UE may be RRC configured to interpret the FDRA in the scheduling DCI as two FDRAs across the two sub-bands. For example, a base station may transmit RRC signaling to the UE indicating for the UE to interpret an FDRA scheduled for one sub-band as allocating a corresponding FDRA in a disjoint sub-band. The UE may then interpret scheduling information (e.g., including an FDRA) according to the RRC configuration. If the UE receives RRC signaling indicating for the UE to interpret the FDRA as a single allocation, or does not receive RRC signaling to interpret an FDRA for a replication of resources, the UE may instead interpret scheduling information with an FDRA in one sub-band as allocating resources in the indicated sub-band without a corresponding FDRA in a disjoint sub-band. In some aspects, an indication (e.g., one or more bits) in the scheduling DCI may be used to indicate to the UE whether the FDRA is allocated over one sub-band or two, disjoint sub-bands. For example, when sending scheduling information in a DCI, the base station may indicate the type of resource allocation interpretation for the UE to apply for disjoint sub-bands. In some aspects, more than one bit may be used to indicate the type of resource allocation interpretation for the UE to apply, and the indication may provide additional information. As an example, the DCI may further indicate the sub-band that will host the resources (e.g., the sub-band to which the FDRA included in the DCI corresponds) and the transmission nature (e.g., whether one TB, more than one TBs, or a repetition scheme is used) across the resources allocated in the disjoint sub-bands. For example, the DCI may indicate whether the UE is to receive PDSCH with repetition as in FIG. 8A, transmit PUSCH with repetition as in FIG. 8B, receive PDSCH mapped across the resources allocated in both sub-bands as in FIG. 9A, transmit PUSCH mapped across the resources allocated in both sub-bands as in FIG. 9B, receive different PDSCHs in the resources of different sub-bands as in FIG. 10A, or transmit different PUSCHs in the resources of different sub-bands as in FIG. 10B. In some aspects, the UE may interpret the FDRA indicated in scheduling information to allocate resources over either one sub-band or multiple sub-bands depending on the slot type. In one example, the UE may interpret that, if the slot type is an SBFD slot (e.g., as shown at 730 in FIG. 7), the UE may interpret one FDRA received in scheduling information as allocating a corresponding FDRA in another, disjoint sub-band. For example, an FDRA may be interpreted as being repeated in the SBFD slots. In another example, the UE may interpret the FDRA according to certain slots that are configured via the RRC message. For example, the UE may receive an RRC configuration indicating for the UE to interpret an FDRA with replication in SBFD slots and to interpret an FDRA without replication in half-duplex slots.

The replication of the FDRA in two sub-bands may be implemented in various ways. In some aspects, when implementing the replication of the FDRA in two sub-bands, the first RB in the second sub-band may be considered as the first RB in the first sub-band. For example, if the first allocated RB in the first sub-band is RB5, then the allocation of the second sub-band may similarly start from the fifth RB from the beginning of the second sub-band. As an example, FIG. 7 illustrates an example in which the FDRA1 may start on the $i^{th}$ RB of the first sub-band, and the FDRA2 may start on the $i^{th}$ RB of the second sub-band, i being an integer number. In some aspects, the replication of the FDRA for the first sub-band in the second sub-band may start from the first RB of the second sub-band.

As the RBG size in each sub-band may be different, replicating the FDRA in the second sub-band may cause the FDRA in the second sub-band to have a different size (i.e., either larger or smaller bandwidth) than the FDRA in the first sub-band. To address this issue, in some aspects, if the RBG sizes in two sub-bands are different, the UE may use the same bitmap in each sub-band regardless of the FDRA size. In other aspects, the UE may interpret the bitmap with an increased bitmap or decreased bitmap size in the second sub-band to match the allocated bandwidth (BW) of the FDRAs in the two sub-bands.

Figure 11:
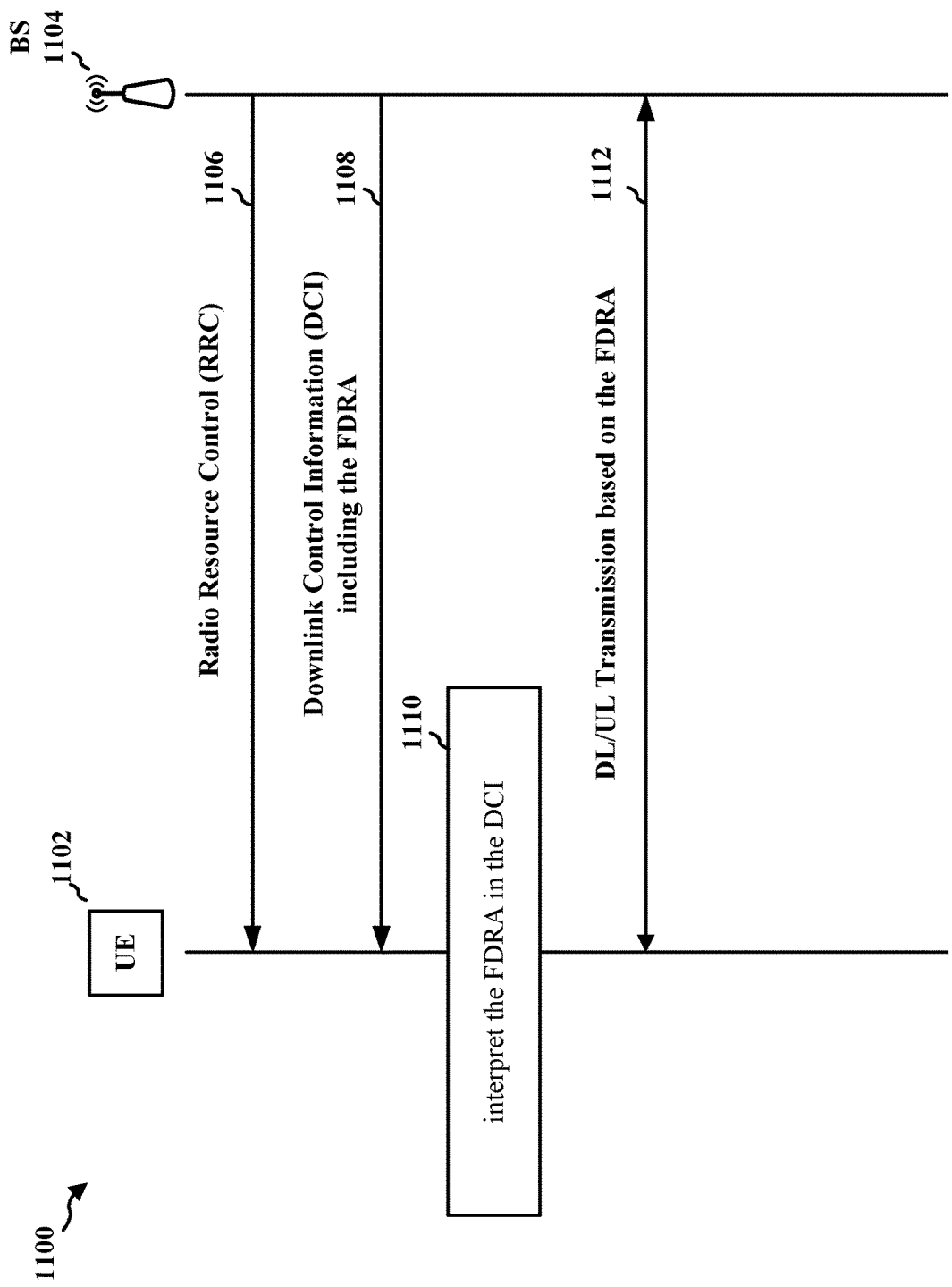
FIG. 11 is a call flow diagram illustrating an SBFD allocation with disjoint sub-bands in accordance with various aspects of the present disclosure.

FIG. 11 is a call flow diagram 1100 illustrating an SBFD resource allocation with disjoint sub-bands in accordance with various aspects of the present disclosure. As illustrated in FIG. 11, in the SBFD resource allocation scheme with disjoint sub-bands, the BS 1104 may transmit DCI 1108, or another resource allocation such as a configured grant or semi-persistent scheduling, to the UE including scheduling information that indicates an FDRA in a first sub-band that is disjoint to a second sub-band. For example, the DCI 1108 may indicate FDRA1 in FIG. 7. At 1110, the UE 1102 may interpret the FDRA received in the DCI. The interpretation may be based on any of the example aspects described in connection with FIGS. 7, 8A, 8B, 9A, 9B, 10A, and 10B, for example. In some aspects, the base station may transmit an RRC configuration 1106 to the UE that indicates for the UE to interpret resources allocated in one sub-band as providing a corresponding resource allocation in a disjoint sub-band. The RRC signaling may indicate one or more slot types for which the UE is to use the interpretation. The RRC signaling may indicate a way that the replicated resources are to be used (e.g., repetition as in FIG. 8A or 8B, mapping a TB across the combined resources as in FIG. 9A or 9B, or for different PUSCH/PDSCH transmissions as in FIG. 10A or 10B). In some aspects, such an indication may be carried in the DCI 1108 rather than in an RRC configuration. In some aspects, the RRC configuration 1106 may indicate for the UE not to interpret the allocated resources with replication, and at 1110, the UE may interpret the resources as being allocated within a single sub-band. The DCI may include the scheme for scheduling FDRAs in disjoint sub-bands for DL/UL transmission between the UE 1102 and the BS 1104, such as those shown in FIGS. 8A, 8B, 9A, 9B, 10A, and 10B. Then, the DL/UL transmissions may be exchanged between the UE 1102 and the BS 1104 based on the resources allocated in the DCI and the interpretation of the resource allocation at 1110. For example, the UE may transmit one or more PUSCH transmissions, and the base station may receive the PUSCH(s), in the FDRAs in the disjoint sub-band, e.g., as described in connection with any of FIG. 8B, 9B, or 10B. As another example, the base station may transmit one or more PDSCH transmissions, and the UE may receive the PDSCH(s), in the FDRAs in the disjoint sub-bands, e.g., as described in connection with any of FIG. 8A, 9A, or 10A.

Figure 12:
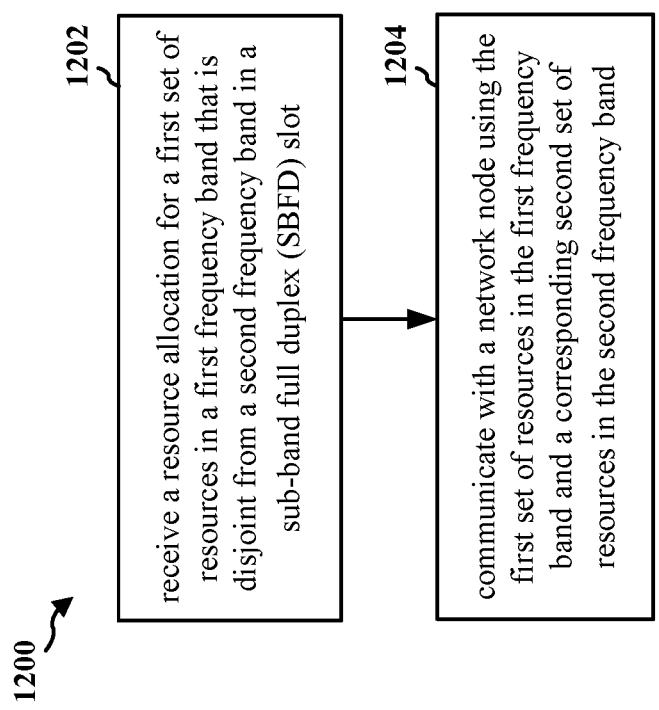
FIG. 12 is a flowchart illustrating methods of wireless communication in accordance with various aspects of the present disclosure.

FIG. 12 is a flowchart 1200 illustrating a method of wireless communication in accordance with various aspects of the present disclosure. The methods may be performed by a UE. The UE may be the UE 104, 350, 1102, or the apparatus 1604 in the hardware implementation of FIG. 16. The methods provide an SBFD resource allocation with disjoint sub-bands, which improves the resource allocation efficiency for scheduling resources over multiple disjoint sub-bands.

As shown in FIG. 12, at 1202, the UE may receive from a network node a resource allocation for a first set of resources in a first frequency band that is disjoint from a second frequency band in an SBFD slot. The network node may be a base station, or a component of a base station, in the access network of FIG. 1 or a core network component (e.g., base station 102, 310; the network entity 1602 in the hardware implementation of FIG. 16). In one example, the reception may be performed by the SBFD receiving component 198. As shown in FIG. 11, in one configuration, the UE 1102 may receive the DCI 1108, or other type of resource allocation such as a configured grant or semi-persistent resource allocation, from the BS 1104, and the DCI 1108 may include the resource allocation for the first set of resources in the first frequency band that is disjoint from the second frequency band in an SBFD slot.

At 1204, the UE may communicate with the network node using the first set of resources in the first frequency band and a corresponding second set of resources in the second frequency band. The communication may be performed by, for example, the SBFD receiving component 198. As shown in FIG. 11, in one configuration, the UE 1102 may communicate, through the DL/UL transmission 1112, with the BS 1104. The communication may use the first set of resources in the first frequency band and the corresponding second set of resources in the second frequency band.

In some aspects, the first frequency band may be a first uplink frequency band, and the second frequency band may be the second uplink frequency band. The first set of resources may be uplink resources in the first uplink frequency band that is separated in the SBFD slot from the second uplink frequency band. The first uplink frequency band and the second uplink frequency band may be separated by at least one of a downlink frequency band and a guard band. The communication with the network node may include transmitting uplink communication to the network node in the first set of resources in the first uplink frequency band and the corresponding second set of resources in the second uplink frequency band.

In one example, as shown in FIG. 8B, the SBFD slot may include the uplink resources. The uplink resources in the SBFD slot may include the first sub-band and the second sub-band that are separated by a downlink frequency band and a guard band. The first set of resources may be the first FDRA 852 in the first sub-band, and the second set of resources may be the second FDRA 854 in the second sub-band. Thus, when communicating with the network node, the UE may use the first FDRA 852 and the second FDRA 854 as the communication resources.

Figure 13:
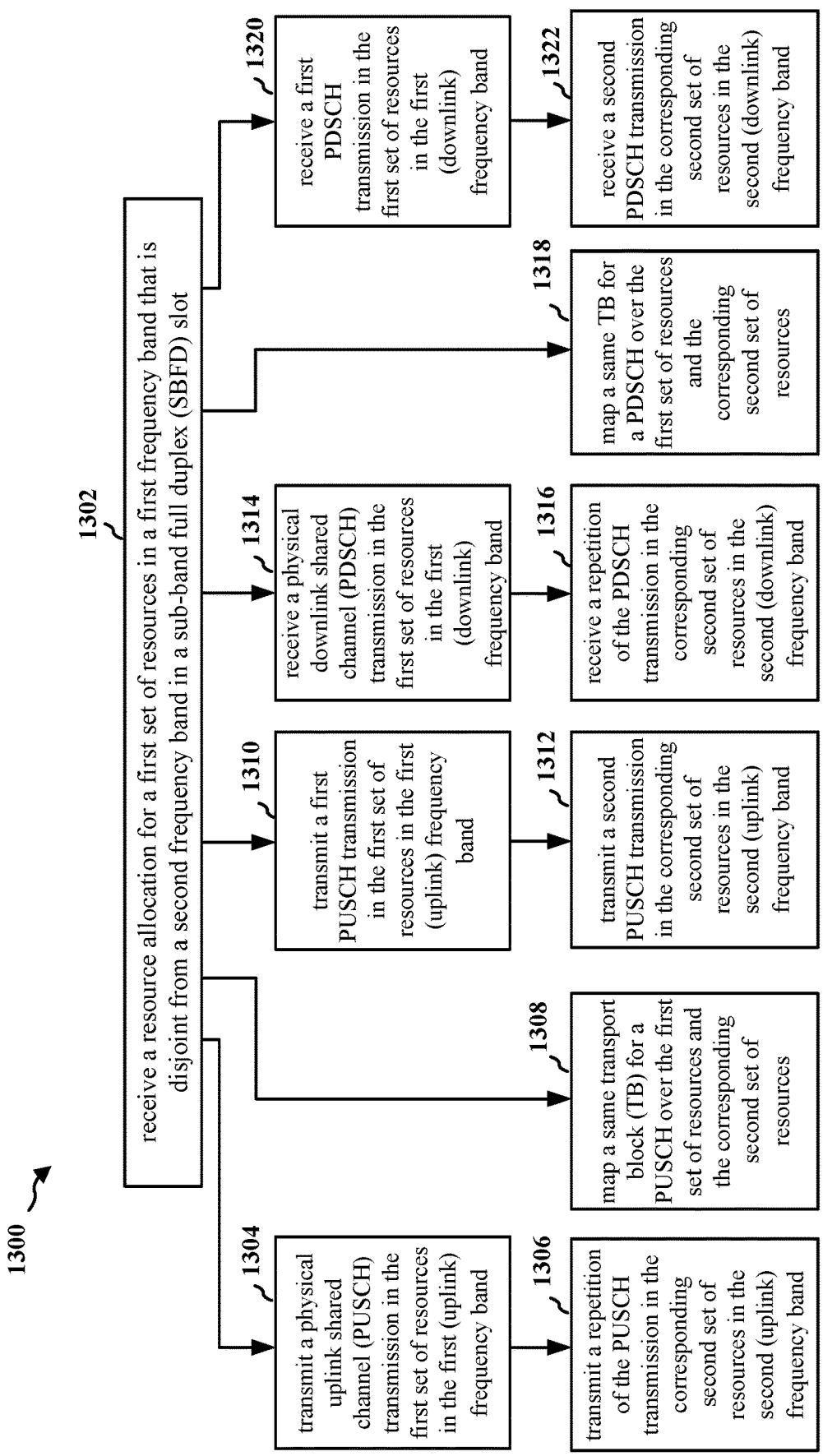
FIG. 13 is a flowchart illustrating methods of wireless communication in accordance with various aspects of the present disclosure.

FIG. 13 is a flowchart 1300 illustrating a method of wireless communication in accordance with various aspects of the present disclosure. The methods may be performed by a UE. The UE may be the UE 104, 350, 1102, or the apparatus 1604 in the hardware implementation of FIG. 16. The methods provide an SBFD resource allocation with disjoint sub-bands, which improves the resource allocation efficiency for scheduling resources over multiple disjoint sub-bands.

As shown in FIG. 13, at 1302, the UE may receive a resource allocation for a first set of resources in a first frequency band that is disjoint from a second frequency band in an SBFD slot. The UE may communicate with a network node using the first set of resources in the first frequency band and a corresponding second set of resources in the second frequency band. The network node may be a base station, or a component of a base station, in the access network of FIG. 1 or a core network component (e.g., base station 102, 310; the network entity 1602 in the hardware implementation of FIG. 16). FIGS. 8A, 8B, 9A, 9B, 10A, and 10B illustrate various examples of the first set of resources in the first frequency band and the second set of resources in the second frequency band.

In some aspects, the communication between the UE and the network node may be uplink communication. Thus, the first frequency band is the first uplink frequency band, and the second frequency band is the second uplink frequency band. The first and the second uplink frequency bands may be separated by at least one of a downlink frequency band and a guard band.

In some aspects, as shown in FIG. 13, at 1304, the UE may transmit a PUSCH transmission in the first set of resources in the first uplink frequency band. At 1306, the UE may transmit a repetition of the PUSCH transmission in the corresponding second set of resources in the second uplink frequency band. For example, as shown in FIG. 8B, the uplink resources in the SBFD slot may include the first sub-band and the second sub-band that are separated by a downlink frequency band and a guard band. The first set of resources may be the first FDRA 852 in the first sub-band, and the second set of resources may be the second FDRA 854 in the second sub-band. When communicating with the network node, the UE may transmit a PUSCH transmission in the first FDRA 852, and transmit a repetition of the PUSCH transmission in the second FDRA 854.

In some aspects, as shown in FIG. 13, at 1308, the UE may map the same TB for a PUSCH over the first set of resources and the corresponding second set of resources. For example, as shown in FIG. 9B, the uplink resources in the SBFD slot may include the first sub-band and the second sub-band that are separated by a downlink frequency band and a guard band. The first set of resources may be the first FDRA 952 in the first sub-band, and the second set of resources may be the second FDRA 954 in the second sub-band. When communicating with the network node, the UE may map the same TB for a PUSCH over the first FDRA 952 and the second FDRA 954. That is, the first FDRA 952 on the first sub-band may include the first portion of the TB, and the second FDRA 954 on the second sub-band may include the second portion of the TB.

In some aspects, as shown in FIG. 13, at 1310, the UE may transmit a first PUSCH transmission in the first set of resources in the first uplink frequency band. At 1312, the UE may transmit a second PUSCH transmission in the corresponding second set of resources in the second uplink frequency band. For example, as shown in FIG. 10B, the uplink resources in the SBFD slot may include the first sub-band and the second sub-band that are separated by a downlink frequency band and a guard band. The first set of resources may be the first FDRA 1052 in the first sub-band, and the second set of resources may be the second FDRA 1054 in the second sub-band. When communicating with the network node, the UE may transmit a first PUSCH (PUSCH 1) transmission in the first FDRA 1052, and transmit a second PUSCH (PUSCH 2) transmission in the second FDRA 1054.

In some aspects, the communication between the UE and the network node may be downlink communication. Thus, the first frequency band is the first downlink frequency band, and the second frequency band is the second downlink frequency band. The first and the second downlink frequency bands may be separated by at least one of an uplink frequency band and a guard band.

In some aspects, as shown in FIG. 13, at 1314, the UE may receive a physical downlink shared channel (PDSCH) transmission in the first set of resources in the first downlink frequency band. At 1316, the UE may receive a repetition of the PDSCH transmission in the corresponding second set of resources in the second downlink frequency band. For example, as shown in FIG. 8A, the downlink resources in the SBFD slot may include the first sub-band and the second sub-band that are separated by an uplink frequency band and a guard band. The first set of resources may be the first FDRA 802 in the first sub-band, and the second set of resources may be the second FDRA 804 in the second sub-band. When communicating with the network node, the UE may receive a PDSCH transmission in the first FDRA 802, and receive a repetition of the PDSCH transmission in the second FDRA 804.

In some aspects, as shown in FIG. 13, at 1318, the UE may map the same TB for a PDSCH over the first set of resources and the corresponding second set of resources. For example, as shown in FIG. 9A, the downlink resources in the SBFD slot may include the first sub-band and the second sub-band that are separated by an uplink frequency band and a guard band. The first set of resources may be the first FDRA 902 in the first sub-band, and the second set of resources may be the second FDRA 904 in the second sub-band. When communicating with the network node, the UE may map the same TB for a PDSCH over the first FDRA 902 and the second FDRA 904. That is, the first FDRA 902 on the first sub-band may include the first portion of the TB, and the second FDRA 904 on the second sub-band may include the second portion of the TB.

In some aspects, as shown in FIG. 13, at 1320, the UE may receive a first PDSCH transmission in the first set of resources in the first downlink frequency band. At 1322, the UE may receive a second PDSCH transmission in the corresponding second set of resources in the second downlink frequency band. For example, as shown in FIG. 10A, the downlink resources in the SBFD slot may include the first sub-band and the second sub-band that are separated by an uplink frequency band and a guard band. The first set of resources may be the first FDRA 1002 in the first sub-band, and the second set of resources may be the second FDRA 1004 in the second sub-band. When communicating with the network node, the UE may receive a first PDSCH (PDSCH 1) transmission in the first FDRA 1002, and receive a second PDSCH (PDSCH 2) transmission in the second FDRA 1004.

In some aspects, in the methods shown in FIGS. 12 and 13, the UE may further receive an indication to interpret the resource allocation as two frequency domain resource allocations across the first frequency band and the second frequency band.

In one example, the indication may be included in an RRC configuration prior to the resource allocation. For example, as shown in FIG. 11, the UE 1102 may receive an RRC from the BS 1104, and the RRC may include the indication.

In one example, the indication may be included in DCI, and the DCI may include the resource allocation. For example, as shown in FIG. 11, the UE 1102 may receive a DCI from the BS 1104, and the DCI may include the indication. The DCI may further include the resource allocation, such as the FDRA.

In some aspects, the indication may include additional information for the resource allocation. For example, in one example, the indication may be a one-bit indication that indicates whether the FDRA is over one sub-band or two sub-bands. In another example, the indication may include a multi-bit indication. The multi-bit indication may indicate information related to the characteristics of the communication, including, but not limited to, the sub-band that hosts the resources (i.e., the primary band among the first frequency band and the second frequency band), whether the communication includes one TB or more than one TBs, whether there is a repetition of the TB over the first frequency band and the second frequency band, whether the same TB is mapped over allocated resources in the first frequency band and the second frequency band, or whether the communication is a transmission or a reception in the first frequency band and the second frequency band.

In some aspects, the UE may communicate with the network node using the first set of resources in the first frequency band and the corresponding second set of resources in the second frequency band based on the slot type. In one example, when the slot type is the SBFD slot or an RRC configured slot type, a single FDRA may be repeated identically across disjoint frequency bands in the SBFD slot (i.e., the FDRA shown in FIG. 8A or 8B are used).

In some aspects, the resource allocation may indicate that the first set of resources starts at an $n^{th}$ resource block in the first frequency band (n being an integer number), and the corresponding second set of resources starts at the $n^{th}$ resource block in the second frequency band. For example, for the FDRAs shown in FIG. 7, FDRA1 may start on the $i^{th}$ RB of the first sub-band, and FDRA2 may start on the $i^{th}$ RB of the second sub-band (i being an integer number).

In some aspects, the resource allocation may indicate that the first set of resources starts at an $n^{th}$ resource block in the first frequency band (n being an integer number), and the corresponding second set of resources starts at the first resource block in the second frequency band.

In some aspects, the first frequency band and the second frequency band have different RBG sizes. In one example, the UE may use the same bitmap in the first frequency band and the second frequency band. In another example, the UE may use a first bitmap for the first frequency band and a modified bitmap for the second frequency band to match a bandwidth allocated in first frequency.

In some aspects, the resource allocation may include a disjoint resource block allocation or a consecutive resource block allocation within the first frequency band.

Figure 14:
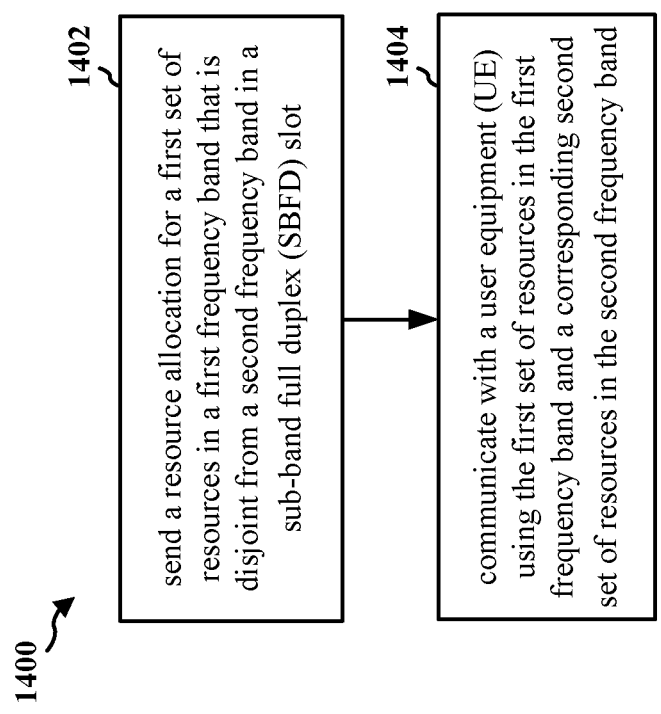
FIG. 14 is a flowchart illustrating methods of wireless communication in accordance with various aspects of the present disclosure.

FIG. 14 is a flowchart 1400 illustrating a method of wireless communication in accordance with various aspects of the present disclosure. The method may be performed by a network node. The network node may be a base station, or a component of a base station, in the access network of FIG. 1, or a network component (e.g., base station 102, 310; BS 1104; or the network entity 1702 in the hardware implementation of FIG. 17). The method provides an SBFD resource allocation with disjoint sub-bands, which improves the resource allocation efficiency for scheduling resources over multiple disjoint sub-bands.

As shown in FIG. 14, at 1402, the network node may send a resource allocation for a first set of resources in a first frequency band that is disjoint from a second frequency band in an SBFD slot. The resource allocation may be sent to a UE. The UE may be the UE 104, 350, 1102, or the apparatus 1604 in the hardware implementation of FIG. 16. In one example, the resource allocation may be sent by the SBFD transmitting component 199. FIGS. 8A, 8B, 9A, 9B, 10A, and 10B illustrate various examples of the first set of resources in the first frequency band and the second set of resources in the second frequency band.

At 1404, the network node may communicate with a user equipment (UE) using the first set of resources in the first frequency band and a corresponding second set of resources in the second frequency band. The communication may be performed by, for example, the SBFD transmitting component 199. As shown in FIG. 11, the BS 1104 may communicate with the UE 1102 through the DL/UL transmission 1112. The communication may use the first set of resources in the first frequency band and the corresponding second set of resources in the second frequency band.

Figure 15:
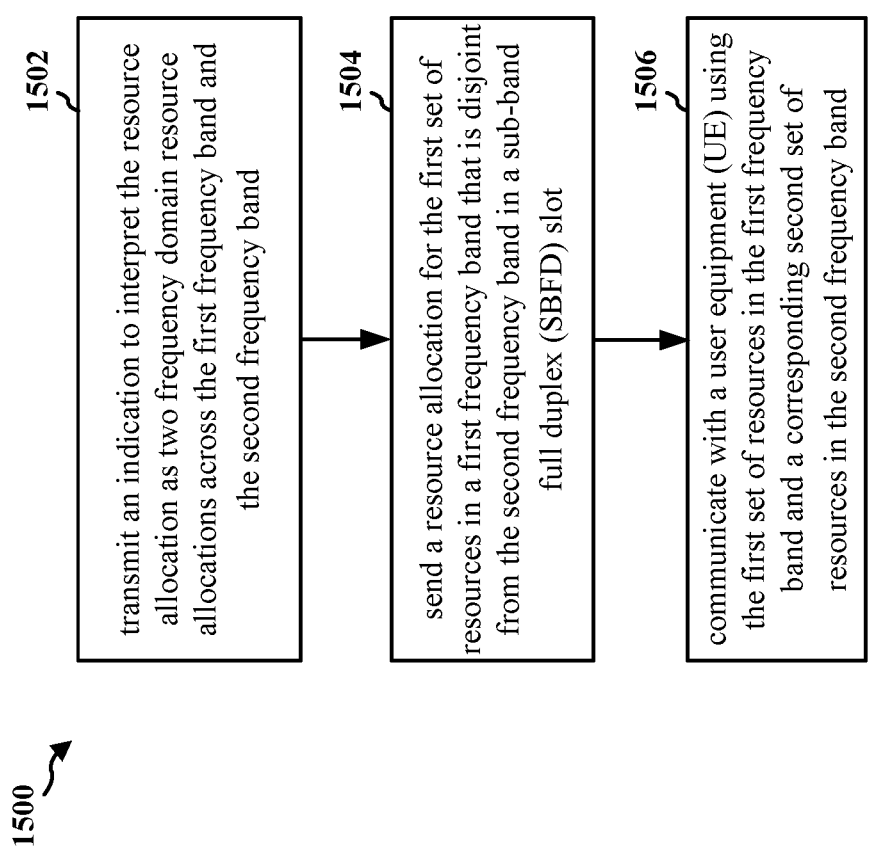
FIG. 15 is a flowchart illustrating methods of wireless communication in accordance with various aspects of the present disclosure.

FIG. 15 is a flowchart 1500 illustrating a method of wireless communication in accordance with various aspects of the present disclosure. The method may be performed by a network node. The network node may be a base station, or a component of a base station, in the access network of FIG. 1, or a network component (e.g., base station 102, 310; BS 1104; or the network entity 1702 in the hardware implementation of FIG. 17). The method provides an SBFD resource allocation with disjoint sub-bands, which improves the resource allocation efficiency for scheduling resources over multiple disjoint sub-bands.

As shown in FIG. 15, steps 1504 and 1506 are similar to, respectively, steps 1402 and 1404 in FIG. 14. That is, at 1504, the network node may send a resource allocation for a first set of resources in a first frequency band that is disjoint from a second frequency band in an SBFD slot. At 1506, the network node may communicate with a UE using the first set of resources in the first frequency band and a corresponding second set of resources in the second frequency band. Details of these procedures are similar to those present in FIG. 14, and therefore are omitted here for the sake of conciseness.

In some aspects, prior to 1504, at 1502, the network node may transmit an indication to interpret the resource allocation as two frequency domain resource allocations across the first frequency band and the second frequency band. In some aspects, the indication may be included in an RRC configuration prior to the resource allocation or is comprised in downlink control information comprising the resource allocation. For example, as shown in FIG. 11, in one configuration, the BS 1104 may transmit 1106 an RRC configuration to the UE 1102, and the RRC configuration may include the indication. In one configuration, the BS 1104 may transmit 1108 the DCI, or other type of resource allocation such as a configured grant or semi-persistent resource allocation, including the resource allocation (e.g., FDRA) to the UE 1102, and the DCI may include the indication.

In some aspects, the indication may be a one-bit indication that indicates whether the FDRA is over one sub-band or two sub-bands. In another example, the indication may include a multi-bit indication. The multi-bit indication may indicate information related to the characteristics of the communication, including, but not limited to, the sub-band that hosts the resources (i.e., the primary band among the first frequency band and the second frequency band), whether the communication includes one TB or more than one TBs, whether there is a repetition of the TB over the first frequency band and the second frequency band, whether the same TB is mapped over allocated resources in the first frequency band and the second frequency band, or whether the communication is a transmission or a reception in the first frequency band and the second frequency band.

In some aspects, the communication with the first set of resources in the first frequency band and the corresponding second set of resources in the second frequency band may be based on the slot type. In one example, when the slot type is the SBFD slot or an RRC configured slot type, a single FDRA may be repeated identically across disjoint frequency bands in the SBFD slot (i.e., the FDRA shown in FIG. 8A or 8B are used).

In some aspects, the resource allocation may indicate that the first set of resources starts at an $n^{th}$ resource block in the first frequency band (n being an integer number), and the corresponding second set of resources starts at the $n^{th}$ resource block in the second frequency band. For example, for the FDRAs shown in FIG. 7, FDRA1 may start on the $i^{th}$ RB of the first sub-band, and FDRA2 may start on the $i^{th}$ RB of the second sub-band (i being an integer number).

In some aspects, the resource allocation may indicate that the first set of resources starts at an $n^{th}$ resource block in the first frequency band (n being an integer number), and the corresponding second set of resources starts at the first resource block in the second frequency band.

In some aspects, the first frequency band and the second frequency band have different resource block group (RBG) sizes. In one example, the UE may use the same bitmap in the first frequency band and the second frequency band. In another example, the UE may use a first bitmap for the first frequency band and a modified bitmap for the second frequency band to match a bandwidth allocated in the first frequency.

Figure 16:
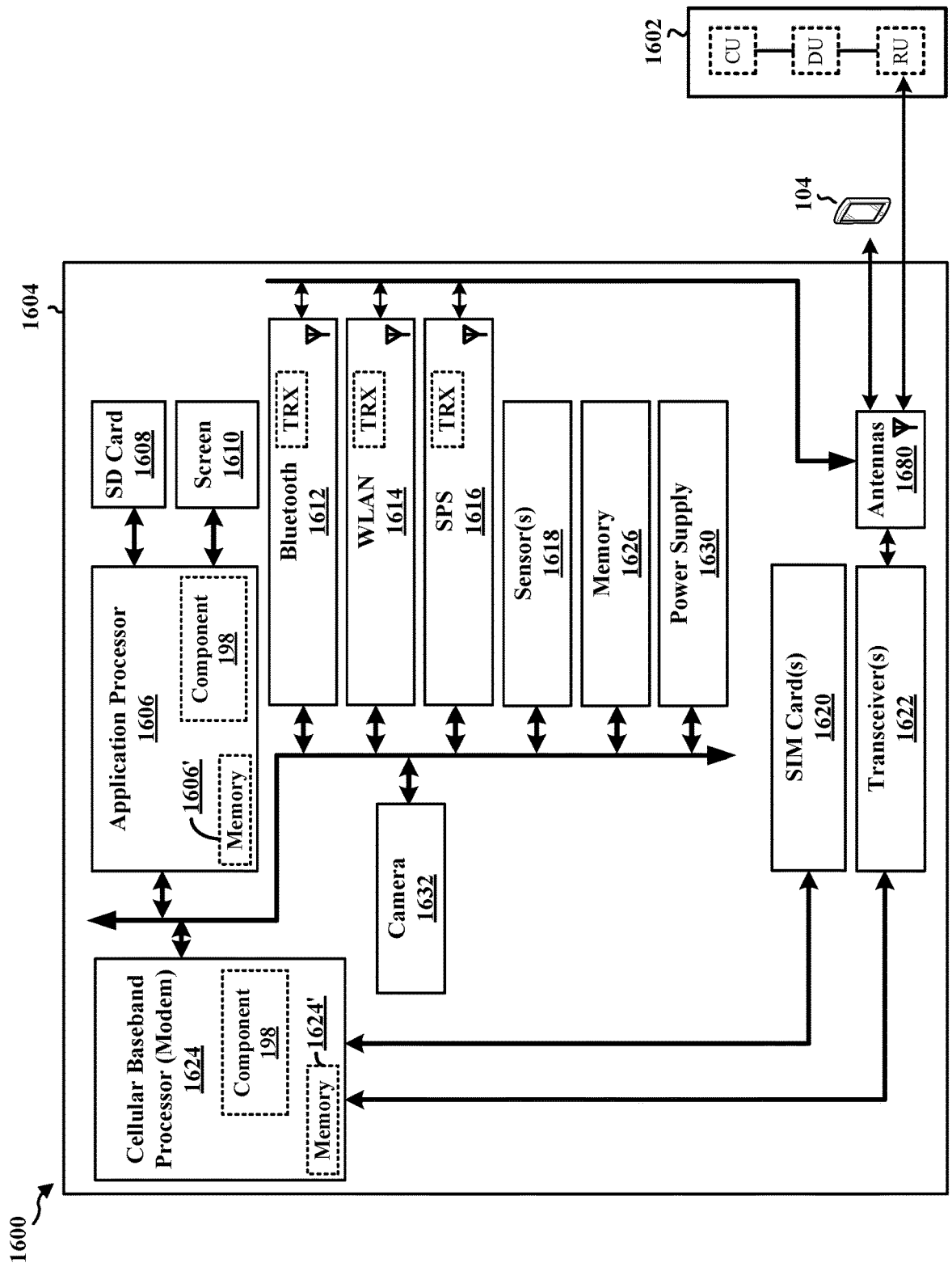
FIG. 16 is a diagram illustrating an example of a hardware implementation for an exemplary apparatus and/or network entity.

FIG. 16 is a diagram 1600 illustrating an example of a hardware implementation for an apparatus 1604. The apparatus 1604 may be a UE, a component of a UE, or may implement UE functionality. In some aspects, the apparatus 1604 may include a cellular baseband processor 1624 (also referred to as a modem) coupled to one or more transceivers 1622 (e.g., cellular RF transceiver). The cellular baseband processor 1624 may include on-chip memory 1624'. In some aspects, the apparatus 1604 may further include one or more subscriber identity modules (SIM) cards 1620 and an application processor 1606 coupled to a secure digital (SD) card 1608 and a screen 1610. The application processor 1606 may include on-chip memory 1606'. In some aspects, the apparatus 1604 may further include a Bluetooth module 1612, a WLAN module 1614, an SPS module 1616 (e.g., GNSS module), one or more sensor modules 1618 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1626, a power supply 1630, and/or a camera 1632. The Bluetooth module 1612, the WLAN module 1614, and the SPS module 1616 may include an on-chip transceiver (TRX) (or in some cases, just a receiver (RX)). The Bluetooth module 1612, the WLAN module 1614, and the SPS module 1616 may include their own dedicated antennas and/or utilize the antennas 1680 for communication. The cellular baseband processor 1624 communicates through the transceiver(s) 1622 via one or more antennas 1680 with the UE 104 and/or with an RU associated with a network entity 1602. The cellular baseband processor 1624 and the application processor 1606 may each include a computer-readable medium/memory 1624', 1606', respectively. The additional memory modules 1626 may also be considered a computer-readable medium/memory. Each computer-readable medium/memory 1624', 1606', 1626 may be non-transitory. The cellular baseband processor 1624 and the application processor 1606 are each responsible for general processing, including the execution of software stored on the computer-readable medium/memory. The software, when executed by the cellular baseband processor 1624/application processor 1606, causes the cellular baseband processor 1624/application processor 1606 to perform the various functions described supra. The computer-readable medium/memory may also be used for storing data that is manipulated by the cellular baseband processor 1624/application processor 1606 when executing software. The cellular baseband processor 1624/application processor 1606 may be a component of the UE 350 and may include the memory 360 and/or at least one of the TX processor 368, the RX processor 356, and the controller/processor 359. In one configuration, the apparatus 1604 may be a processor chip (modem and/or application) and include just the cellular baseband processor 1624 and/or the application processor 1606, and in another configuration, the apparatus 1604 may be the entire UE (e.g., see 350 of FIG. 3) and include the additional modules of the apparatus 1604.

As discussed supra, the component 198 (i.e., the SBFD receiving component 198) may be configured to receive a resource allocation for a first set of resources in a first frequency band that is disjoint from a second frequency band in an SBFD slot; and communicate with a network node using the first set of resources in the first frequency band and a corresponding second set of resources in the second frequency band. The SBFD receiving component 198 may be further configured to perform any of the aspects described in connection with the flowchart in FIG. 12 or 13, and/or performed by the UE in FIG. 11. The component 198 may be within the cellular baseband processor 1624, the application processor 1606, or both the cellular baseband processor 1624 and the application processor 1606. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1604 may include a variety of components configured for various functions. In one configuration, the apparatus 1604, and in particular the cellular baseband processor 1624 and/or the application processor 1606, includes means for receiving a resource allocation for a first set of resources in a first frequency band that is disjoint from a second frequency band in an SBFD slot, and means for communicating with a network node using the first set of resources in the first frequency band and a corresponding second set of resources in the second frequency band. The apparatus may further include means to perform any of the aspects described in connection with the flowcharts in FIG. 12 or 13, and/or performed by the UE in FIG. 11. The means may be the component 198 of the apparatus 1604 configured to perform the functions recited by the means. As described supra, the apparatus 1604 may include the TX processor 368, the RX processor 356, and the controller/processor 359. As such, in one configuration, the means may be the TX processor 368, the RX processor 356, and/or the controller/processor 359 configured to perform the functions recited by the means.

Figure 17:
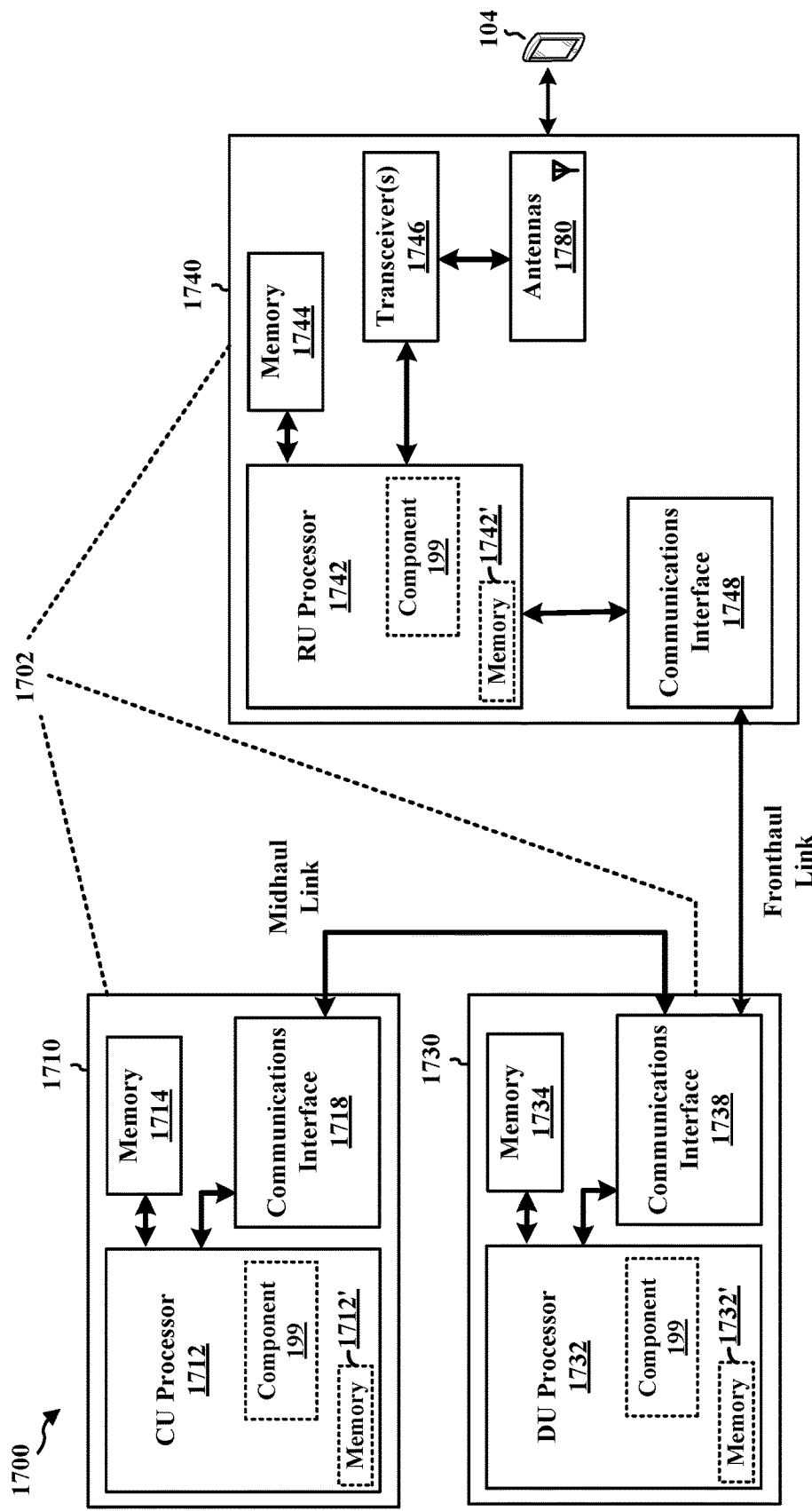
FIG. 17 is a diagram illustrating an example of a hardware implementation for an exemplary network entity.

FIG. 17 is a diagram 1700 illustrating an example of a hardware implementation for a network entity 1702. The network entity 1702 may be a BS, a component of a BS, or may implement BS functionality. The network entity 1702 may include at least one of a CU 1710, a DU 1730, or an RU 1740. For example, depending on the layer functionality handled by the component 199, the network entity 1702 may include the CU 1710; both the CU 1710 and the DU 1730; each of the CU 1710, the DU 1730, and the RU 1740; the DU 1730; both the DU 1730 and the RU 1740; or the RU 1740. The CU 1710 may include a CU processor 1712. The CU processor 1712 may include on-chip memory 1712'. In some aspects, the CU 1710 may further include additional memory modules 1714 and a communications interface 1718. The CU 1710 communicates with the DU 1730 through a midhaul link, such as an F1 interface. The DU 1730 may include a DU processor 1732. The DU processor 1732 may include on-chip memory 1732'. In some aspects, the DU 1730 may further include additional memory modules 1734 and a communications interface 1738. The DU 1730 communicates with the RU 1740 through a fronthaul link. The RU 1740 may include an RU processor 1742. The RU processor 1742 may include on-chip memory 1742'. In some aspects, the RU 1740 may further include additional memory modules 1744, one or more transceivers 1746, antennas 1780, and a communications interface 1748. The RU 1740 communicates with the UE 104. The on-chip memory 1712', 1732', 1742' and the additional memory modules 1714, 1734, 1744 may each be considered a computer-readable medium/memory. Each computer-readable medium/memory may be non-transitory. Each of the processors 1712, 1732, 1742 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 (i.e., the SBFD transmitting component 199) may be configured to send a resource allocation for a first set of resources in a first frequency band that is disjoint from a second frequency band in an SBFD slot; and communicate with a UE using the first set of resources in the first frequency band and a corresponding second set of resources in the second frequency band. The SBFD transmitting component 199 may be further configured to perform any of the aspects described in connection with the flowcharts in FIG. 14 or 15, and/or performed by the BS in FIG. 11. The component 199 may be within one or more processors of one or more of the CU 1710, DU 1730, and the RU 1740. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1702 may include a variety of components configured for various functions. In one configuration, the network entity 1702 includes means for sending a resource allocation for a first set of resources in a first frequency band that is disjoint from a second frequency band in an SBFD slot, and means for communicating with a UE using the first set of resources in the first frequency band and a corresponding second set of resources in the second frequency band. The network entity may further include means for performing any of the aspects described in connection with the flowchart in FIG. 14 or 15, and/or performed by the BS in FIG. 11. The means may be the component 199 of the network entity 1702 configured to perform the functions recited by the means. As described supra, the network entity 1702 may include the TX processor 316, the RX processor 370, and the controller/processor 375. As such, in one configuration, the means may be the TX processor 316, the RX processor 370, and/or the controller/processor 375 configured to perform the functions recited by the means.

Aspects of the present disclosure provide for a method of wireless communication at a UE and related apparatus. In the method, the UE receives a resource allocation for a first set of resources in a first frequency band that is disjoint from a second frequency band in an SBFD slot, and communicates with a network node using the first set of resources in the first frequency band and a corresponding second set of resources in the second frequency band. The method allows the FDRAs in multiple disjoint sub-bands be allocated according to various schemes, and thus improves the resource allocation efficiency for scheduling resources over multiple disjoint sub-bands.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and is not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a UE. The method comprises receiving a resource allocation for a first set of resources in a first frequency band that is disjoint from a second frequency band in a sub-band full duplex (SBFD) slot; and communicating with a network node using the first set of resources in the first frequency band and a corresponding second set of resources in the second frequency band.

Aspect 2 is the method of aspect 1, wherein the first set of resources are uplink resources in a first uplink frequency band that is separated in the SBFD slot from a second uplink frequency band by at least one of a downlink frequency band or a guard band, and communicating with the network node includes transmit uplink communication to the network node using the first set of resources in the first uplink frequency band and the corresponding second set of resources in the second uplink frequency band.

Aspect 3 is the method of aspect 2, wherein transmitting the uplink communication includes: transmitting a PUSCH transmission in the first set of resources in the first uplink frequency band; and transmitting a repetition of the PUSCH transmission in the corresponding second set of resources in the second uplink frequency band.

Aspect 4 is the method any of aspects 1 or 2, wherein the method further includes mapping a same transport block for a PUSCH over the first set of resources and the corresponding second set of resources.

Aspect 5 is the method of aspect 2, wherein transmitting the uplink communication includes: transmitting a first PUSCH transmission in the first set of resources in the first uplink frequency band; and transmitting a second PUSCH transmission in the corresponding second set of resources in the second uplink frequency band.

Aspect 6 is the method of aspect 1, wherein the first set of resources are downlink resources in a first downlink frequency band that is separated in the SBFD slot from a second downlink frequency band by at least one of an uplink frequency band or a guard band, and communicating with the network node includes: receiving downlink communication from the network node in the first set of resources in the first downlink frequency band and the corresponding second set of resources in the second downlink frequency band.

Aspect 7 is the method of aspect 6, wherein receiving downlink communication includes: receiving a PDSCH transmission in the first set of resources in the first downlink frequency band; and receiving a repetition of the PDSCH transmission in the corresponding second set of resources in the second downlink frequency band.

Aspect 8 is the method of any of aspects 1 and 6, wherein the method further includes: mapping a same transport block for a PDSCH over the first set of resources and the corresponding second set of resources.

Aspect 9 is the method of aspect 6, wherein receiving downlink communication includes: receive a first PDSCH transmission in the first set of resources in the first downlink frequency band; and receive a second PDSCH transmission in the corresponding second set of resources in the second downlink frequency band.

Aspect 10 is the method of any of aspects 1-9, wherein the method further includes: receiving an indication to interpret the resource allocation as two frequency domain resource allocations across the first frequency band and the second frequency band.

Aspect 11 is the method of aspect 10, wherein the indication is comprised in an RRC configuration prior to the resource allocation.

Aspect 12 is the method of aspect 10, wherein the indication is comprised in downlink control information comprising the resource allocation.

Aspect 13 is the method of aspect 10, wherein the indication further indicates one of: a primary band among the first frequency band and the second frequency band, repetition of a transmission over the first frequency band and the second frequency band, mapping a same transport block over allocated resources in the first frequency band and the second frequency band, or transmission or reception of different transmissions in the first frequency band and the second frequency band.

Aspect 14 is the method of any of aspects 1-13, wherein the UE communicates with the network node using the first set of resources in the first frequency band and the corresponding second set of resources in the second frequency band based on the slot type.

Aspect 15 is the method of aspect 14, wherein the slot type is the SBFD slot or an RRC configured slot type associated with interpreting a single FDRA across disjoint frequency bands.

Aspect 16 is the method of any of aspects 1-15, wherein the resource allocation indicates that the first set of resources starts at an $n^{th}$ resource block in the first frequency band, n being an integer number, and the corresponding second set of resources starts at the $n^{th}$ resource block in the second frequency band.

Aspect 17 is the method of any of aspects 1-15, wherein the resource allocation indicates that the first set of resources starts at an $n^{th}$ resource block in the first frequency band, n being an integer number, and the corresponding second set of resources starts at a first resource block in the second frequency band.

Aspect 18 is the method of any of aspects 1-17, wherein the first frequency band and the second frequency band have different RBG sizes.

Aspect 19 is the method of aspect 18, wherein the UE uses a same bitmap in the first frequency band and the second frequency band.

Aspect 20 is the method of aspect 18, wherein the UE uses a first bitmap for the first frequency band and a modified bitmap for the second frequency band to match a bandwidth allocated in first frequency.

Aspect 21 is the method of any of aspects 1-20, wherein the resource allocation comprises a disjoint resource block allocation or a consecutive resource block allocation within the first frequency band.

Aspect 22 is an apparatus comprising means for performing the method of any of aspect 1-21.

Aspect 23 is an apparatus comprising a memory; and at least one processor coupled to the memory and, based at least in part on the information stored in the memory, the at least one processor is configured to perform the method of any of aspects 1-21.

In aspect 24, the apparatus of aspects 22 or 23 further includes at least one transceiver.

Aspect 25 is a non-transitory computer-readable medium storing computer executable code at, the code when executed by a processor causes the processor to perform the method of any of aspects 1-21.

Aspect 26 is a method of wireless communication at a network node. The method includes: sending a resource allocation for a first set of resources in a first frequency band that is disjoint from a second frequency band in an SBFD slot; and communicating with a UE using the first set of resources in the first frequency band and a corresponding second set of resources in the second frequency band.

Aspect 27 is the method of aspect 26, wherein the method further includes: transmitting an indication to interpret the resource allocation as two frequency domain resource allocations across the first frequency band and the second frequency band, wherein the indication is comprised in an RRC configuration prior to the resource allocation or is comprised in downlink control information comprising the resource allocation.

Aspect 28 is the method of aspect 27, wherein the indication further indicates one of: a primary band among the first frequency band and the second frequency band, repetition of a transmission over the first frequency band and the second frequency band, mapping a same transport block over allocated resources in the first frequency band and the second frequency band, or transmission or reception of different transmissions in the first frequency band and the second frequency band.

Aspect 29 is the method of any of aspects 26-28, wherein communication with the first set of resources in the first frequency band and the corresponding second set of resources in the second frequency band is based on the slot type.

Aspect 30 is the method of any of aspects 26-29, wherein the resource allocation indicates that the first set of resources starts at an $n^{th}$ resource block in the first frequency band, n being an integer number, and the corresponding second set of resources starts at the $n^{th}$ resource block in the second frequency band.

Aspect 31 is the method of any of aspects 26-29, wherein the resource allocation indicates that the first set of resources starts at an $n^{th}$ resource block in the first frequency band, n being an integer number, and the corresponding second set of resources starts at a first resource block in the second frequency band.

Aspect 32 is the method of any of aspect 26-31, wherein the first frequency band and the second frequency band have different RBG sizes.

Aspect 33 is an apparatus comprising means for performing the method of any of aspect 26-32.

Aspect 34 is an apparatus comprising a memory; and at least one processor coupled to the memory and, based at least in part on the information stored in the memory, the at least one processor is configured to perform the method of any of aspects 26-32.

In aspect 35, the apparatus of aspects 33 or 34 further includes at least one transceiver.

Aspect 36 is a non-transitory computer-readable medium storing computer executable code at, the code when executed by a processor causes the processor to perform the method of any of aspects 26-32.

What is claimed is:

1. An apparatus for wireless communication at a user equipment (UE), comprising:
   memory; and
   at least one processor coupled to the memory and, based at least in part on information stored in the memory, the at least one processor is configured to:
   receive a resource allocation for a first set of resources in a first frequency band that is disjoint from a second frequency band in a sub-band full duplex (SBFD) slot; and
   communicate with a network node using the first set of resources in the first frequency band and a corresponding second set of resources in the second frequency band including one of:
   a transmission of a same transport block mapped over the first set of resources in the first frequency band and the corresponding second set of resources in the second frequency band, or
   a first transmission in the first set of resources in the first frequency band and a repetition of the first transmission in the corresponding second set of resources in the second frequency band.

2. The apparatus of claim 1, wherein the first set of resources are uplink resources in a first uplink frequency band that is separated in the SBFD slot from a second uplink frequency band by at least one of a downlink frequency band or a guard band, and wherein, to communicate with the network node, the at least one processor is configured to:
   transmit uplink communication to the network node using the first set of resources in the first uplink frequency band and the corresponding second set of resources in the second uplink frequency band.

3. The apparatus of claim 2, wherein the first transmission is a physical uplink shared channel (PUSCH) transmission, and wherein, to transmit the uplink communication, the at least one processor is configured to:
   transmit the PUSCH transmission in the first set of resources in the first uplink frequency band; and
   transmit the repetition of the PUSCH transmission in the corresponding second set of resources in the second uplink frequency band.

4. The apparatus of claim 2, wherein the transmission is a physical uplink shared channel (PUSCH) transmission, and the at least one processor is further configured to:
   map the same transport block for the PUSCH transmission over the first set of resources and the corresponding second set of resources.

5. The apparatus of claim 1, wherein the first set of resources are downlink resources in a first downlink frequency band that is separated in the SBFD slot from a second downlink frequency band by at least one of an uplink frequency band or a guard band, and wherein to communicate with the network node, the at least one processor is configured to:
   receive downlink communication from the network node in the first set of resources in the first downlink frequency band and the corresponding second set of resources in the second downlink frequency band.

6. The apparatus of claim 5, wherein the first transmission is a physical downlink shared channel (PDSCH) transmission, and wherein, to receive the downlink communication, the at least one processor is configured to:
   receive the PDSCH transmission in the first set of resources in the first downlink frequency band; and
   receive the repetition of the PDSCH transmission in the corresponding second set of resources in the second downlink frequency band.

7. The apparatus of claim 5, wherein the transmission is a physical downlink shared channel (PDSCH) transmission, and wherein the downlink communication maps the same transport block for the PDSCH transmission over the first set of resources and the corresponding second set of resources.

8. The apparatus of claim 1, wherein the at least one processor is further configured to:
   receive an indication to interpret the resource allocation as two frequency domain resource allocations across the first frequency band and the second frequency band.

9. The apparatus of claim 8, wherein the indication is comprised in a radio resource control (RRC) configuration prior to the resource allocation.

10. The apparatus of claim 8, wherein the indication is comprised in downlink control information comprising the resource allocation.

11. The apparatus of claim 8, wherein the indication further indicates one of:
   a primary band among the first frequency band and the second frequency band,
   the repetition of the transmission over the first frequency band and the second frequency band,
   mapping the same transport block over allocated resources in the first frequency band and the second frequency band, or
   transmission or reception of different transmissions in the first frequency band and the second frequency band.

12. The apparatus of claim 1, wherein the at least one processor is configured to communicate with the network node using the first set of resources in the first frequency band and the corresponding second set of resources in the second frequency band based on a slot type.

13. The apparatus of claim 12, wherein the slot type is the SBFD slot or an RRC configured slot type associated with interpreting a single frequency domain resource allocation (FDRA) across disjoint frequency bands.

14. The apparatus of claim 1, wherein the resource allocation indicates that the first set of resources starts at an nth resource block in the first frequency band, n being an integer number, and the corresponding second set of resources starts at the nth resource block in the second frequency band.

15. The apparatus of claim 1, wherein the resource allocation indicates that the first set of resources starts at an $n^{th}$ resource block in the first frequency band, n being an integer number, and the corresponding second set of resources starts at a first resource block in the second frequency band.

16. The apparatus of claim 1, wherein the first frequency band and the second frequency band have different resource block group (RBG) sizes.

17. The apparatus of claim 16, wherein a same bitmap is used in the first frequency band and the second frequency band.

18. The apparatus of claim 16, wherein a first bitmap is used for the first frequency band and a modified bitmap is used for the second frequency band to match a bandwidth allocated in first frequency.

19. The apparatus of claim 1, wherein the resource allocation comprises a disjoint resource block allocation or a consecutive resource block allocation within the first frequency band.

20. An apparatus of wireless communication at a network node, comprising:
memory; and
at least one processor coupled to the memory and, based at least in part on information stored in the memory, the at least one processor is configured to:
send a resource allocation for a first set of resources in a first frequency band that is disjoint from a second frequency band in a sub-band full duplex (SBFD) slot; and
communicate with a user equipment (UE) using the first set of resources in the first frequency band and a corresponding second set of resources in the second frequency band including one of:
a transmission of a same transport block mapped over the first set of resources in the first frequency band and the corresponding second set of resources in the second frequency band, or
a first transmission in the first set of resources in the first frequency band and a repetition of the first transmission in the corresponding second set of resources in the second frequency band.

21. The apparatus of claim 20, wherein the at least one processor is further configured to:
transmit an indication to interpret the resource allocation as two frequency domain resource allocations across the first frequency band and the second frequency band, wherein the indication is comprised in a radio resource control (RRC) configuration prior to the resource allocation or is comprised in downlink control information comprising the resource allocation.

22. The apparatus of claim 21, wherein the indication further indicates one of:
a primary band among the first frequency band and the second frequency band,
the repetition of the transmission over the first frequency band and the second frequency band,
mapping the same transport block over allocated resources in the first frequency band and the second frequency band, or
transmission or reception of different transmissions in the first frequency band and the second frequency band.

23. The apparatus of claim 20, wherein communication with the first set of resources in the first frequency band and the corresponding second set of resources in the second frequency band is based on a slot type.

24. The apparatus of claim 20, wherein the resource allocation indicates that the first set of resources starts at an $n^{th}$ resource block in the first frequency band, n being an integer number, and the corresponding second set of resources starts at the $n^{th}$ resource block in the second frequency band.

25. The apparatus of claim 20, wherein the resource allocation indicates that the first set of resources starts at an $n^{th}$ resource block in the first frequency band, n being an integer number, and the corresponding second set of resources starts at a first resource block in the second frequency band.

26. The apparatus of claim 20, wherein the first frequency band and the second frequency band have different resource block group (RBG) sizes.

27. A method for wireless communication at a user equipment (UE), comprising:
receiving a resource allocation for a first set of resources in a first frequency band that is disjoint from a second frequency band in a sub-band full duplex (SBFD) slot; and
communicating with a network node using the first set of resources in the first frequency band and a corresponding second set of resources in the second frequency band including one of:
a transmission of a same transport block mapped over the first set of resources in the first frequency band and the corresponding second set of resources in the second frequency band, or
a first transmission in the first set of resources in the first frequency band and a repetition of the first transmission in the corresponding second set of resources in the second frequency band.

28. A method of wireless communication at a network node, comprising:
sending a resource allocation for a first set of resources in a first frequency band that is disjoint from a second frequency band in a sub-band full duplex (SBFD) slot; and
communicating with a user equipment (UE) using the first set of resources in the first frequency band and a corresponding second set of resources in the second frequency band including one of:
a transmission of a same transport block mapped over the first set of resources in the first frequency band and the corresponding second set of resources in the second frequency band, or
a first transmission in the first set of resources in the first frequency band and a repetition of the first transmission in the corresponding second set of resources in the second frequency band.

29. The apparatus of claim 20, wherein the first transmission is a physical uplink shared channel (PUSCH) transmission, and wherein, to communicate with the UE, the at least one processor is configured to:

receive the PUSCH transmission in the first set of resources in a first uplink frequency band; and receive the repetition of the PUSCH transmission in the corresponding second set of resources in a second uplink frequency band.

30. The apparatus of claim 20, wherein the transmission is a physical uplink shared channel (PUSCH) transmission and, to communicate with the UE, the at least one processor is configured to:

receive the PUSCH that maps the same transport block over the first set of resources and the corresponding second set of resources.

31. The apparatus of claim 20, wherein the first transmission is a physical downlink shared channel (PDSCH) transmission, and wherein, to communicate with the UE, the at least one processor is configured to:

transmit the PDSCH transmission in the first set of resources in a first downlink frequency band; and transmit the repetition of the PDSCH transmission in the corresponding second set of resources in a second downlink frequency band.

32. The apparatus of claim 20, wherein the transmission is a physical downlink shared channel (PDSCH) transmission and, to communicate with the UE, the at least one processor is configured to:

map the same transport block over the first set of resources and the corresponding second set of resources; and transmit the PDSCH transmission.

* * * * *